US012516205B2

United States Patent
Liu et al.

(10) Patent No.: US 12,516,205 B2
(45) Date of Patent: Jan. 6, 2026

(54) METAL NANOPARTICLE INK

(71) Applicant: Iowa State University Research Foundation, Inc., Ames, IA (US)

(72) Inventors: Fei Liu, Ames, IA (US); Tyler Kirscht, Ames, IA (US); Matthew Marander, Ames, IA (US); Liangkui Jiang, Changsha (CN); Hantang Qin, Ames, IA (US); Shan Jiang, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 81 days.

(21) Appl. No.: 18/361,428

(22) Filed: Jul. 28, 2023

(65) Prior Publication Data

US 2024/0034895 A1 Feb. 1, 2024

Related U.S. Application Data

(60) Provisional application No. 63/369,875, filed on Jul. 29, 2022.

(51) Int. Cl.
| | | |
|---|---|---|
| *C09D 11/14* | (2006.01) | |
| *C09D 11/033* | (2014.01) | |
| *C09D 11/037* | (2014.01) | |
| *C09D 11/52* | (2014.01) | |

(52) U.S. Cl.
CPC ............ *C09D 11/14* (2013.01); *C09D 11/033* (2013.01); *C09D 11/037* (2013.01); *C09D 11/52* (2013.01)

(58) Field of Classification Search
None
See application file for complete search history.

(56) References Cited

U.S. PATENT DOCUMENTS

| | | | | |
|---|---|---|---|---|
| 2005/0136231 A1* | 6/2005 | Voss-Kehl | ............ | H05K 3/105 |
| | | | | 428/209 |
| 2009/0288517 A1* | 11/2009 | Chretien | ................ | C09D 11/52 |
| | | | | 977/777 |
| 2015/0310954 A1* | 10/2015 | Liu | .......................... | H01B 1/02 |
| | | | | 428/221 |

OTHER PUBLICATIONS

Suwan et al.; Silver Nanoparticles Fabricated by Reducing Property of Cellulose Derivatives; Drug Discoveries & Therapeutics; 2019; 13(2):70-79.*
Cortes Pena, A.Y., "A Novel Solid State Ultracapacitor", NASA TM 2017 219686, (Aug. 2017), 44 pages.
El Sheikh, M. A., "Green Synthesis of Hydroxyethyl Cellulose-Stabilized Silver Nanoparticles", Hindawi Publishing Corporation Journal of Polymers vol. 2013 Article ID 650837, (Jul. 15, 2013), 12 pages.
Goswami, A. K., "Dielectric Properties of Unsintered Barium Titanate", J Appl Phys 40, (Feb. 1, 1969), 7 pages.
Hill, Curtis W., "Materials and Process Development for Printable Electronics at MSFC", IEEE SoutheastCon2019, (Apr. 2019), 13 pages.
Homes, Christopher C., "Doping for superior dielectrics", Nature Materials vol. 12, (Sep. 2013), 2 pages.

(Continued)

*Primary Examiner* — Michael P. Rodriguez
(74) *Attorney, Agent, or Firm* — Schwegman Lundberg & Woessner, P.A.

(57) ABSTRACT

An ink includes metal nanoparticles stabilized with cellulose or a cellulose derivative. A method of forming an electrically conductive pathway includes printing the ink on a substrate, and sintering the printed ink, to form the electrically conductive pathway on the substrate.

18 Claims, 15 Drawing Sheets

(56) References Cited

OTHER PUBLICATIONS

Olson, Emily, "Self-assembly in biobased nanocomposites for multifunctionality and improved performance", Nanoscale Adv., 2021, 3, 4321, (Jun. 2021), 28 pages.
Sun, Wenbin, "Oil in water emulsions stabilized by hydrophobically modified hydroxyethyl cellulose Adsorption and thickening effect", Journal of Colloid and Interface Science 311, (Mar. 2007), 9 pages.
Wang, Yan, "Fabrication of submicron La2O3-coated BaTiO3 particles and fine-grained ceramics with temperature stable dielectric properties", Scripta Materialia vols. 90 91, (Nov. 2014), 4 pages.
Wang, Yan, "Fabrication of lanthanum doped BaTiO3 fine grained ceramics with a high dielectric constant and temperature stable dielectric properties using hydro phase method at atmospheric pressure", Journal of the European Ceramic Society 37, (Feb. 2017), 6 pages.
Zulkifli, Farah Hanani, "A facile synthesis method of hydroxyethyl cellulose silver nanoparticle scaffolds for skin tissue engineering applications", Materials Science and Engineering C 79, (Oct. 2017), 10 pages.
Fernandes, Lara J., et al., "Silver nanoparticle conductive inks: synthesis, characterization, and fabrication of inkjet-printed flexible electrodes", Scientific Reports, 10:8878, (2020), 11 pgs.
Liu, Weijun, et al., "Silver nanorods using HEC as a template by ?-irradiation technique and absorption dose that changed their nanosize and morphology", Materials Letters, 61, (2007), 1801-1804.
Mou, Yun, et al., "Fabrication of highly conductive and flexible printed electronics by low temperature sintering reactive silver ink", Applied Surface Science, 459, (2018), 249-256.
Mou, Yun, et al., "Facile preparation of stable reactive silver ink for highly conductive and flexible electrodes", Applied Surface Science, 475, (2019), 75-82.
Suwan, Temsiri, et al., "Silver nanoparticles fabricated by reducing property of cellulose derivatives", Drug Discoveries & Therapeutics, 13(2), (2019), 70-79.

\* cited by examiner

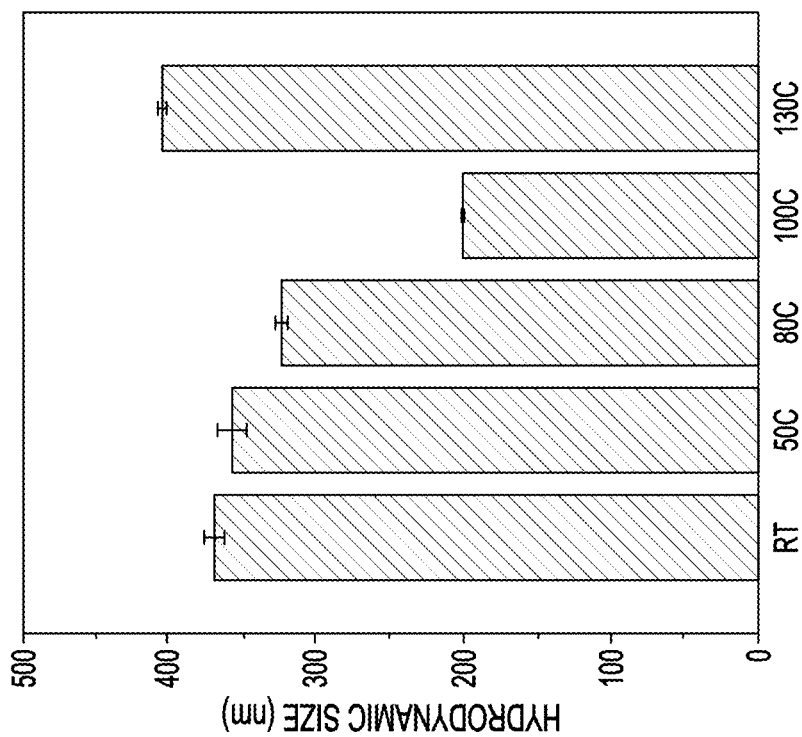
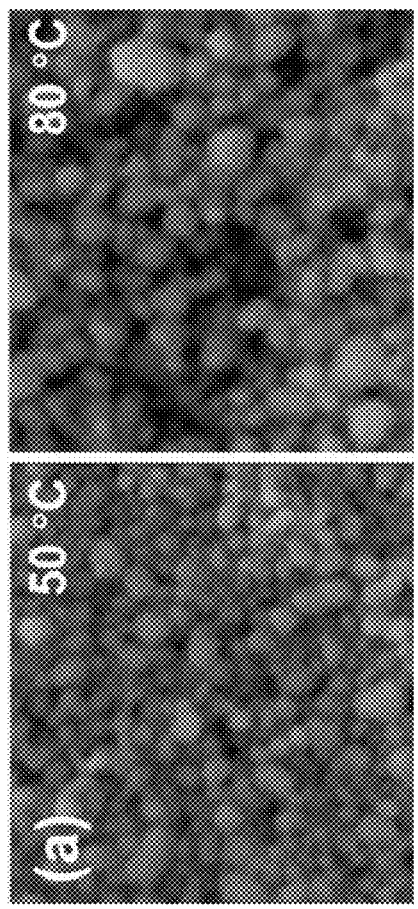
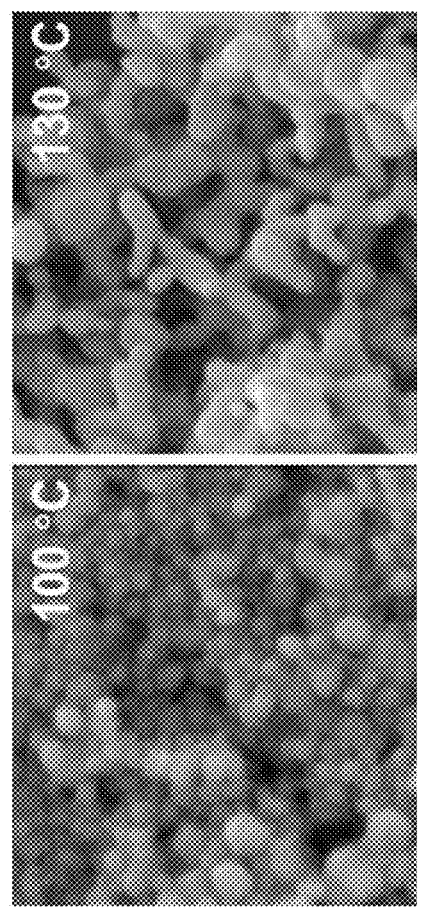
FIG. 2A  FIG. 2B
FIG. 2C  FIG. 2D
FIG. 2E

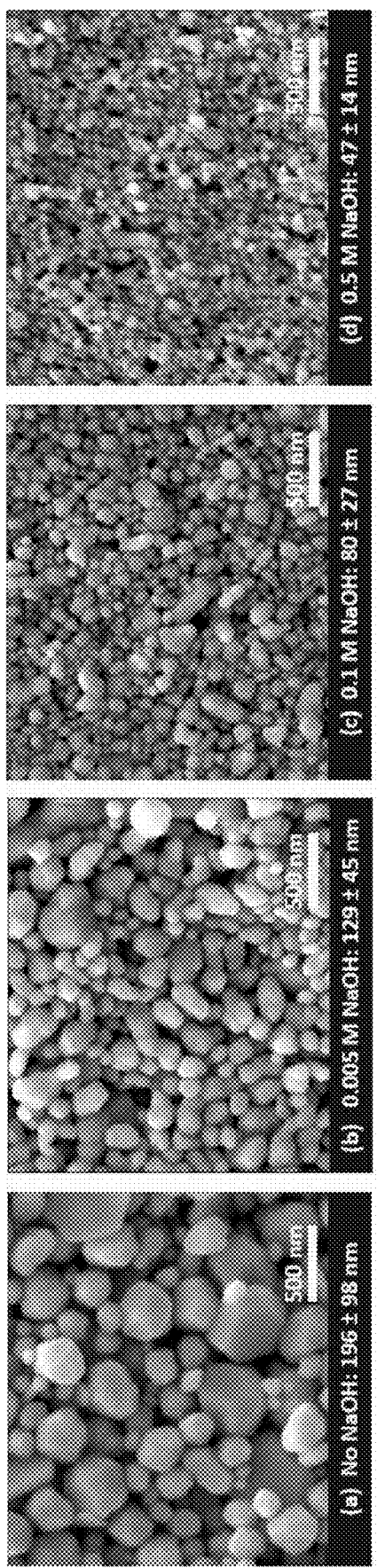

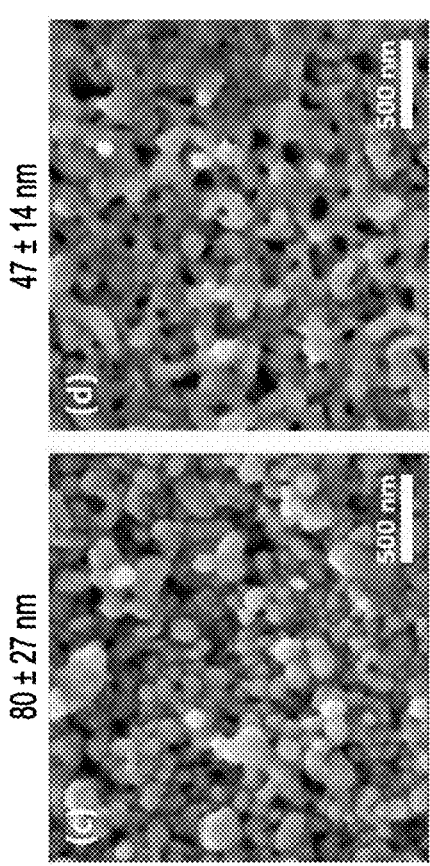
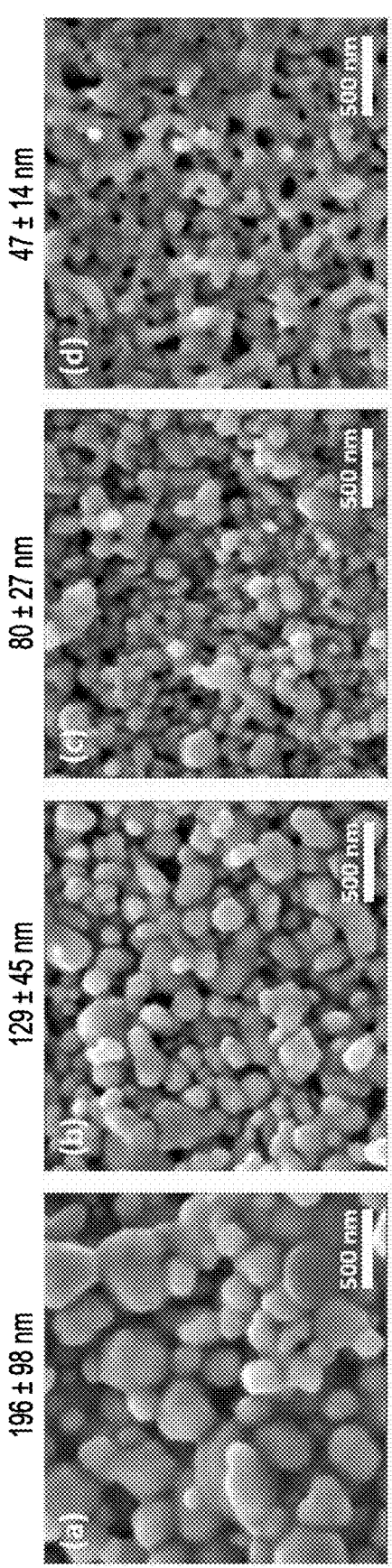
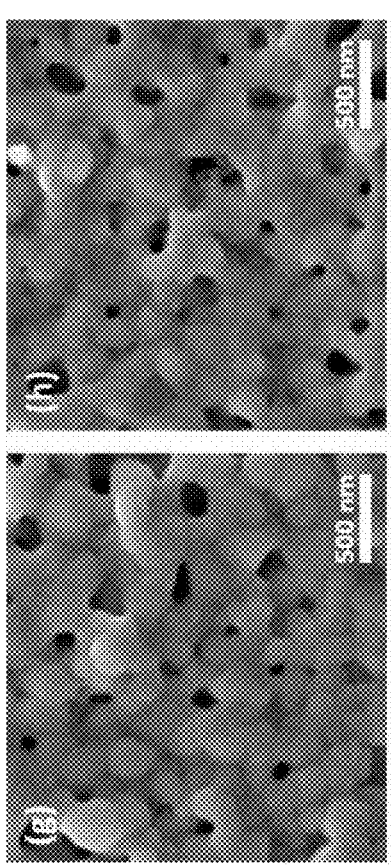
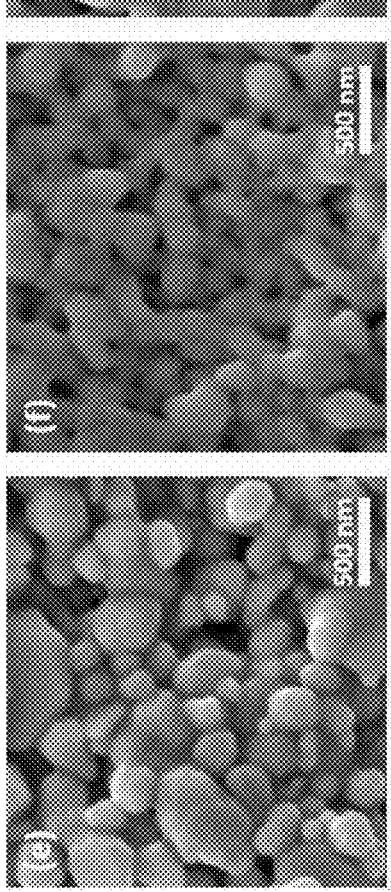
FIG. 4A 196 ± 98 nm; FIG. 4B 129 ± 45 nm; FIG. 4C 80 ± 27 nm; FIG. 4D 47 ± 14 nm (150 °C for 30 minutes)
FIG. 4E 196 ± 98 nm; FIG. 4F 129 ± 45 nm; FIG. 4G 80 ± 27 nm; FIG. 4H 47 ± 14 nm (200 °C for 30 minutes)

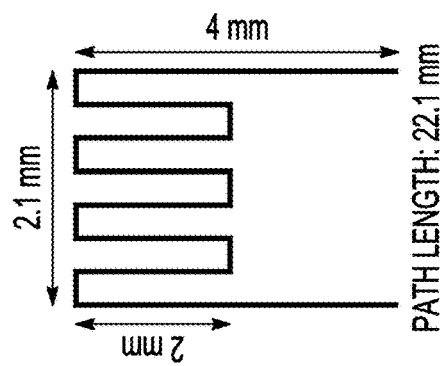
FIG. 9A
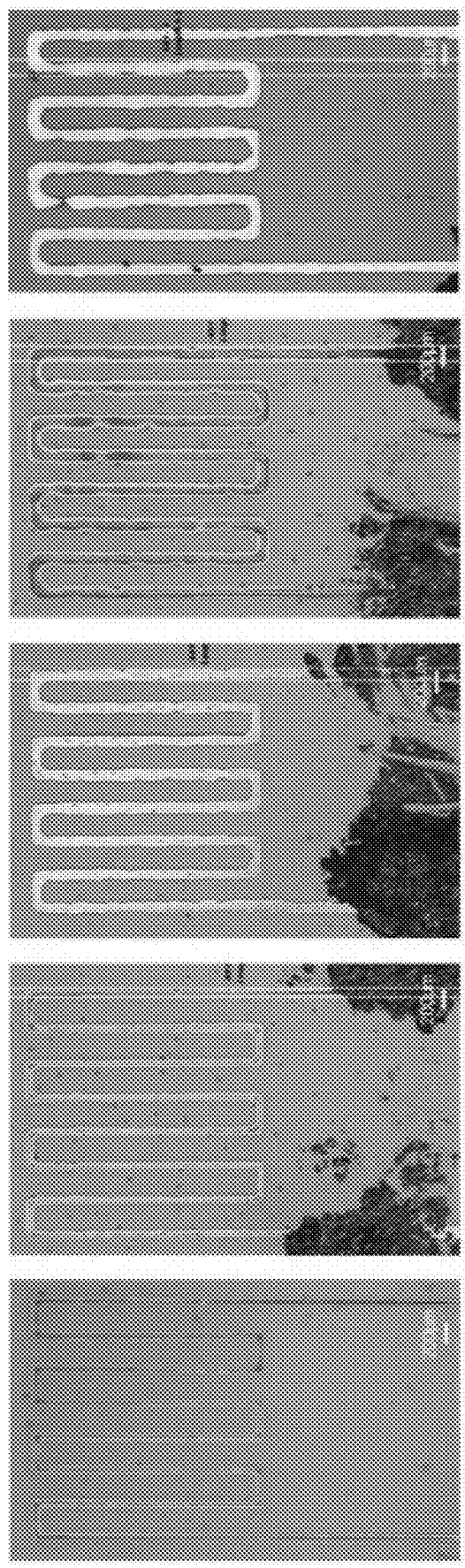

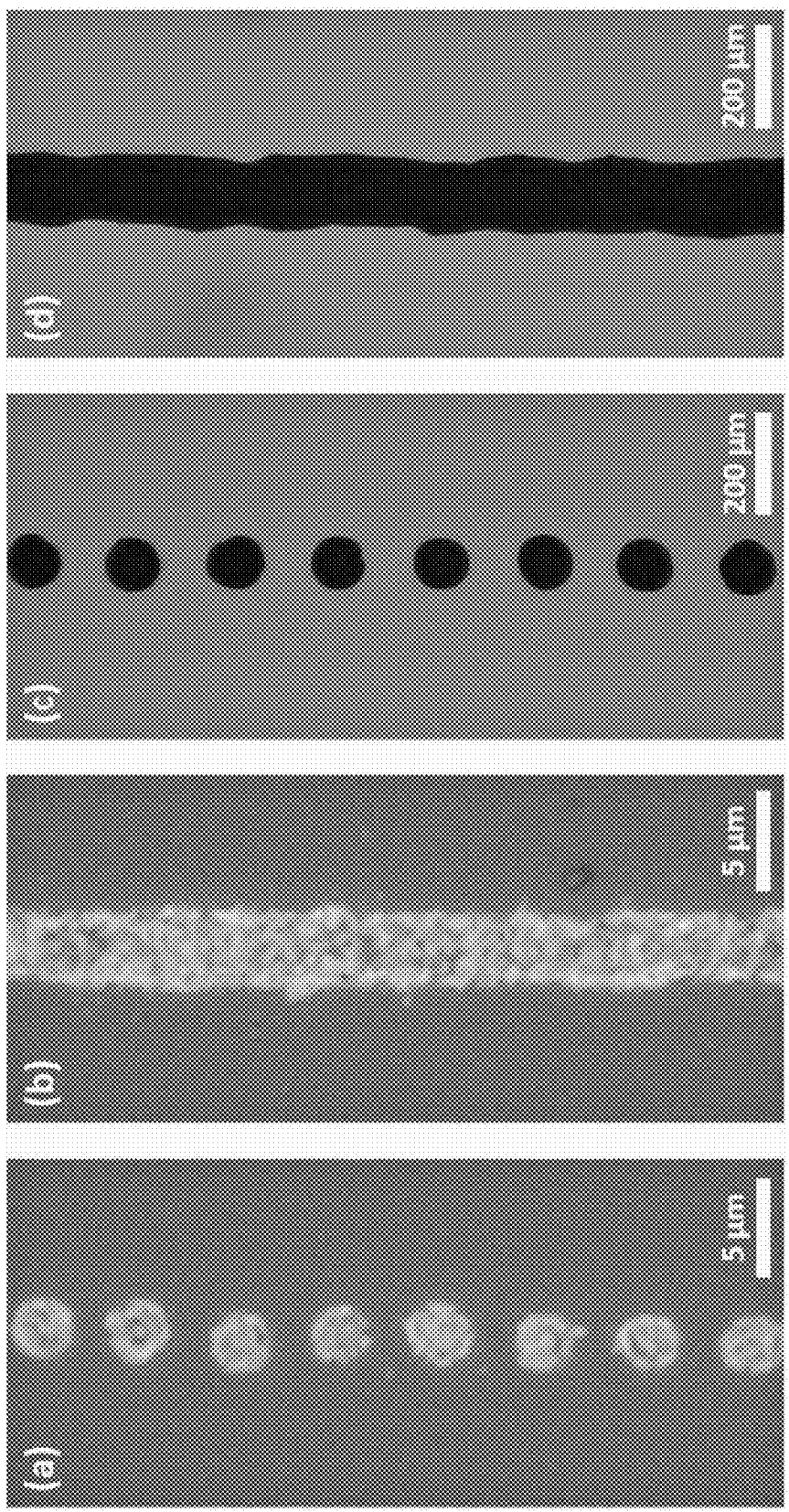

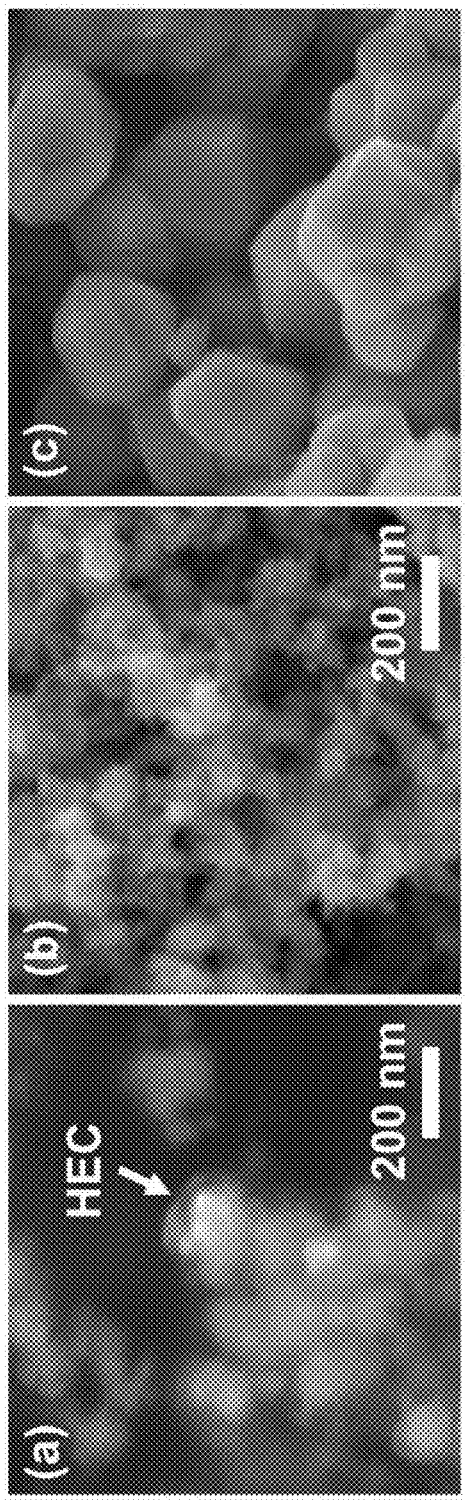
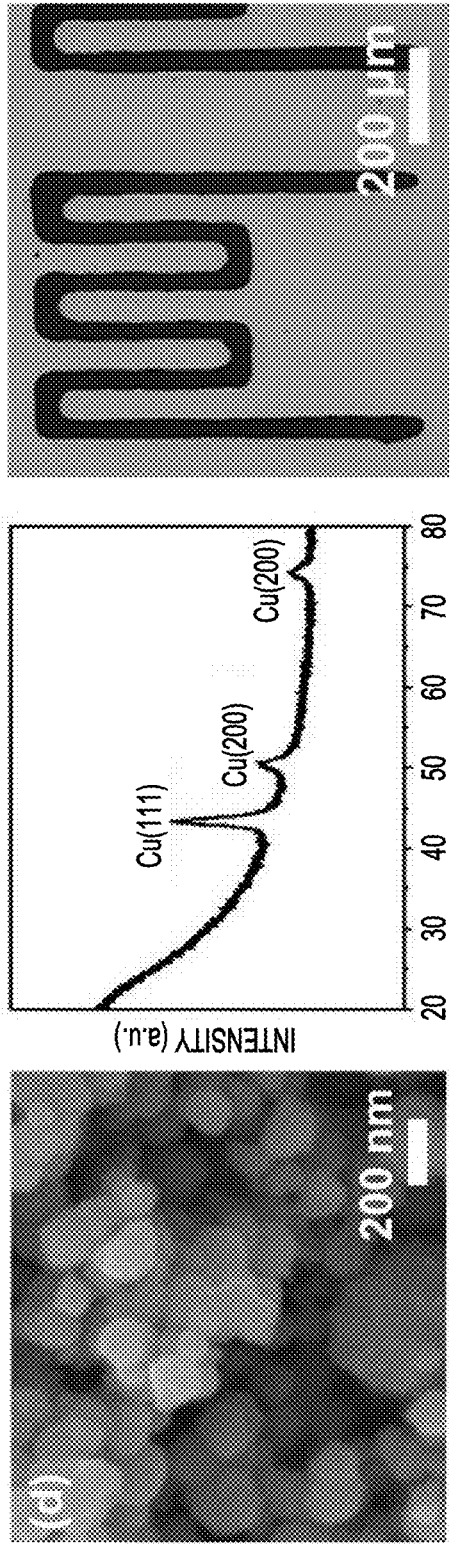
FIG. 12A  FIG. 12B  FIG. 12C
FIG. 12D  FIG. 12E  FIG. 12F

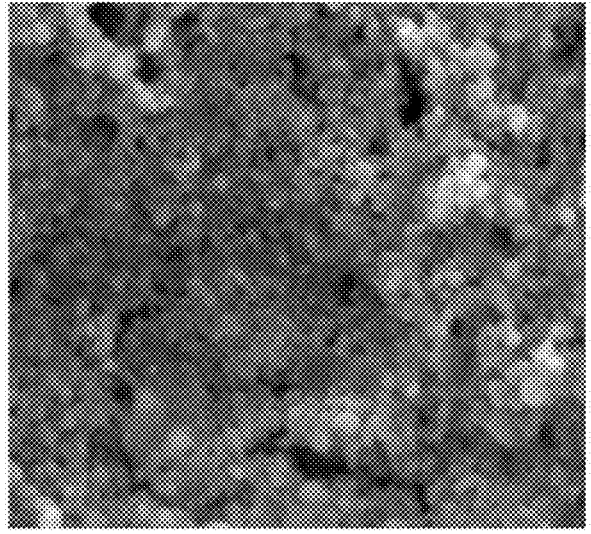
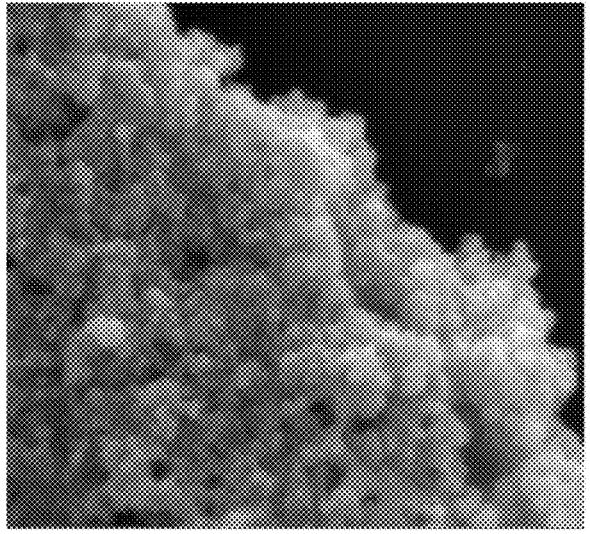
FIG. 13A　　　　　　　　FIG. 13B
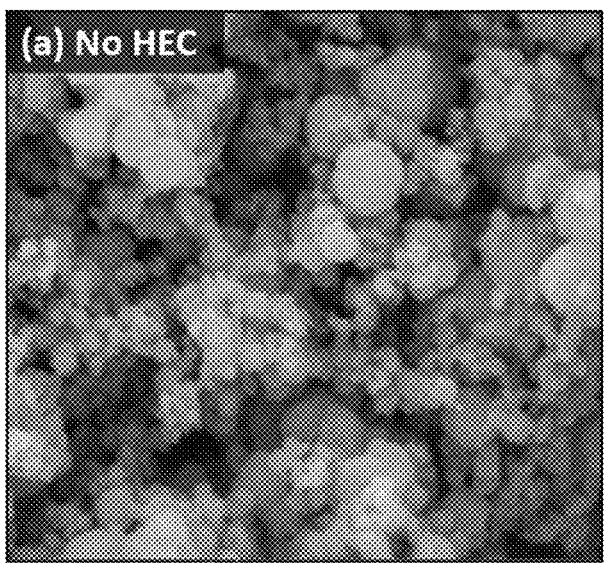
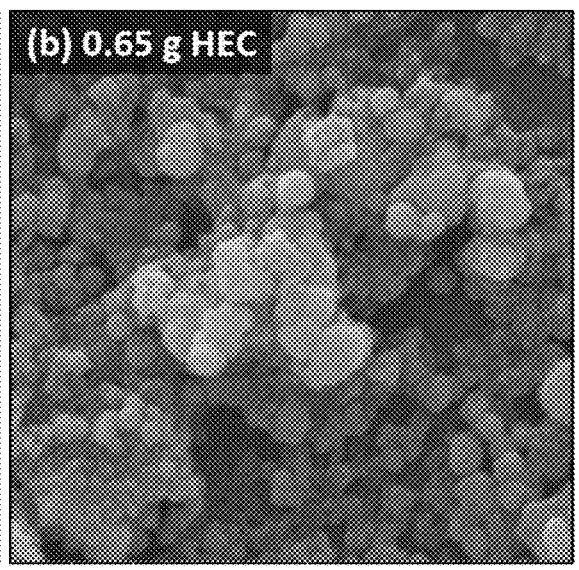
FIG. 14A　　　　　　　　FIG. 14B

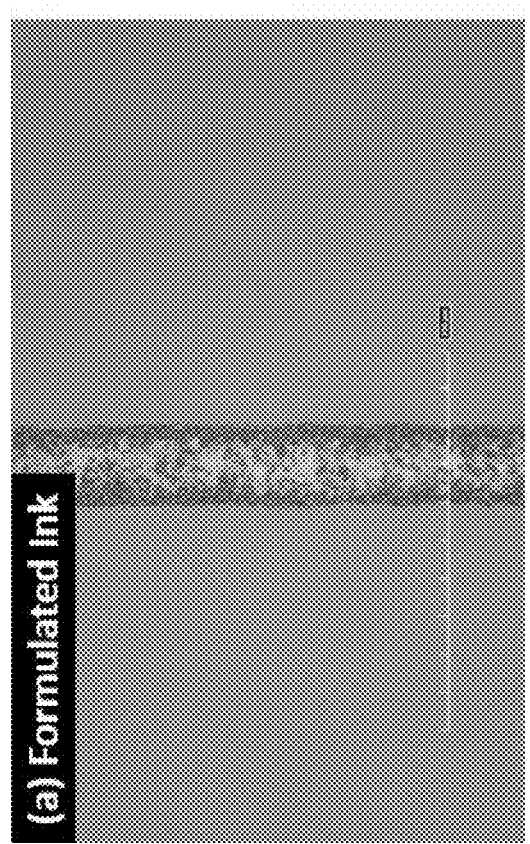
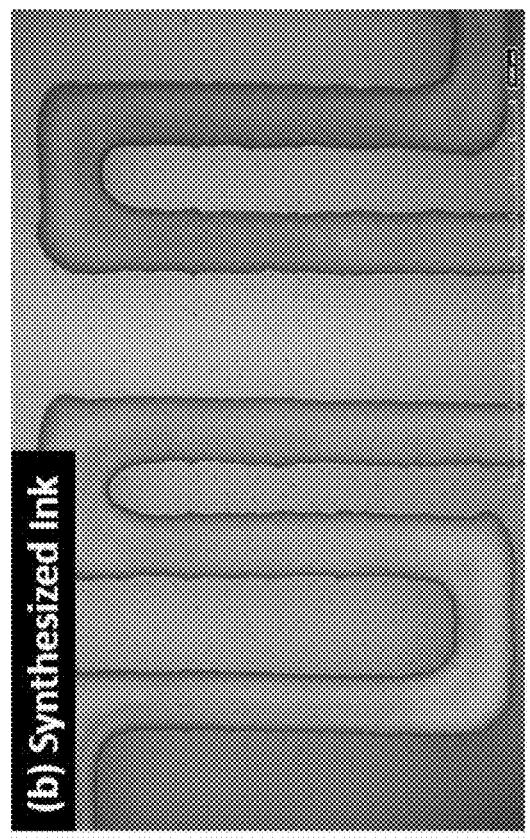
FIG. 16A
FIG. 16B

METAL NANOPARTICLE INK

CROSS-REFERENCE TO RELATED APPLICATION

This application claims the benefit of priority to U.S. Provisional Patent Application Ser. No. 63/369,875 filed Jul. 29, 2022, the disclosure of which is incorporated herein in its entirety by reference.

STATEMENT OF GOVERNMENT SUPPORT

This invention was made with U.S. government support under grants 80NSSC20M0107 and 80NSSC21M0360 awarded by NASA. The U.S. government has certain rights in the invention.

BACKGROUND

Inkjet printing has been investigated as an alternative production tool for the fabrication of conductive elements and devices in the field of flexible electronics. This fabrication technique deposits particles of the material with desirable electrical properties onto a substrate, after which, the printed pattern is converted into conductive elements.

There are benefits related to the inkjet printing, namely, a simple fabrication process, low cost, reduction of material waste, and excellent adequacy to several substrates. This printing process involves the storage of ink in a cartridge and the ejection of an exact amount of material through the nozzles. Therefore, the fabrication of flexible circuits, sensors, and other printed materials represents a great technological advancement compared with other standard methods, such as drop casting or stamping.

Silver remains one of the best options for application as a conductive ink and adhesives, compared to other electrically conductive fillers. This is mainly due to its high electrical and thermal conductivity, chemical stability, relatively low cost (compared to gold or graphene, for example), and the ability of its oxide form to conduct electricity. Additionally, silver nanoparticles have a low melting point, which promotes the generation of conductive thin films in relatively low temperatures, which is vital to applications in flexible substrates, such polymers and papers.

Different methods can be used for the synthesis and stabilization of silver nanoparticles. One of the most popular approaches is chemical reduction, using a variety of organic and inorganic reducing agents. Depending on the method used silver nanoparticles can be fabricated with different morphologies, sizes, shapes, and concentrations.

Conductive inks are generally deposited onto a substrate using electrohydrodynamic (EHD) ink-jet printing. EHD has been actively researched as a means of refining ink-jet printing. Currently, most of the research on this topic has centralized on the development of the printing process and optimization, while few studies have focused on the relationships between printing materials properties and printed patterns performance.

Flexible printed electronics have received widespread attention in many applications, such as flexible electrodes, photovoltaic cells, radio frequency identification (RFID) tags, smart clothing, and light-emitting diodes (LEDs) due to their simplicity, cost-effectiveness, scalability, and unique flexibility. As an essential and indispensable component of printed electronics, various conductive inks, including conductive polymers, carbon nanotube, graphene, and metal nanoparticle ink, have been developed for fabricating conductive tracks. Compared with conducting polymers, carbon nanotubes, and graphene inks, metal nanoparticle ink is more conducive and achieves highly conductive printed electronics because of its excellent electrical conductivity.

It is well known that high sintering temperature (>200° C.) is essential for sintering nanoparticles and removing non-conductive organic stabilizers, but such high temperature easily leads to the distortion or melting of flexible polymer substrates, which hinders the development and application of flexible electronics. Although the photonic and chemical sintering of metal nanoparticles have been proposed for constructing conductive tracks at lower temperature or room temperature, these approaches still have their own disadvantages, such as expensive photonic sintering equipment, complicated pre-treatments and post-treatments, poor adhesion with substrates, and specific stabilizers and sintering agents. More importantly, the spontaneous aggregation of nanoparticles and stability of inks still is not resolved in the literature, which has adverse effects on the printing stability, shelf life of inks, and reproducible performance of tracks.

Even though particle-free silver reactive inks have received significant attention in the past, they suffer from lack of stability and poor conductivity.

SUMMARY

Various aspects of the present invention provide an ink that includes metal nanoparticles. The metal nanoparticles are stabilized with cellulose or a cellulose derivative.

Various aspects of the present invention provide an ink that includes a reaction product of a composition that includes a silver precursor, a barium titanate precursor, a copper precursor, a tungsten precursor, or a combination thereof. The composition also includes cellulose or a cellulose derivative.

Various aspects of the present invention provide an ink that includes a reaction product of a composition that includes silver nitrate, silver acetate, silver citrate, copper hydroxide, copper acetate, copper acetate hydrate, tungsten tungstate dihydrate, barium acetate with titanium tetrachloride, or a combination thereof. The composition also includes hydroxyethyl cellulose.

Various aspects of the present invention provide a method of printing. The method includes printing an ink on a substrate, the ink including metal nanoparticles that are stabilized with cellulose or a cellulose derivative.

Various aspects of the present invention provide a method forming a sintered ink. The method includes printing an ink on a substrate, the ink including metal nanoparticles that are stabilized with cellulose or a cellulose derivative. The method includes sintering the ink, to provide the sintered ink on the substrate.

Various aspects of the present invention provide a method of forming an electrically conductive pathway. The method includes an ink on a substrate, the ink including metal nanoparticles that are stabilized with cellulose or a cellulose derivative. The method includes sintering the printed ink, to form the electrically conductive pathway on the substrate.

Various aspects of the present invention provide a method of making an ink that includes metal nanoparticles that are stabilized with cellulose or a cellulose derivative. The method includes forming a reaction solution including cellulose or a cellulose derivative and a metal nanoparticle precursor to form the metal nanoparticles. The method also includes suspending the metal nanoparticles in a solvent to form the ink.

Various aspects of the ink, method of printing, and method of making the ink of the present invention have advantages over other conventional inks and methods. For example, in various aspects, the ink of the present invention can be stable for longer periods than other metal nanoparticle inks; for example, the ink of the present invention can be shelf-stable without agglomeration or settling of metal nanoparticles for six months or more. In various aspects, the ink of the present invention can be easily printed to form a conductive pattern, such as via electrohydrodynamic printing. In various aspects, the ink of the present invention can print smoother patterns that can be sintered to form conductive pathways having higher conductivity than possible from printing and sintering conventional metal nanoparticle inks.

In various aspects, the method of making the ink of the present invention can provide the metal nanoparticles and the ink at a higher yield than other methods of forming nanoparticle inks. In various aspects, the method of making the ink of the present invention can be more easily and conveniently scaled-up than other methods of forming metal nanoparticle inks. In various aspects, the method can include controlling the resulting particle size of the formed metal nanoparticles and/or controlling the resulting viscosity of the formed ink; in various aspects, the particle size and/or viscosity can be more easily controlled as compared to other methods of making metal nanoparticle inks. In various aspects, the method can include controlling the particle size to be small (e.g., via inclusion of more base during the reduction to form the metal nanoparticles), which can provide metal nanoparticles that can be sintered to form a more highly electrically conductive pathway as compared to sintering of other metal nanoparticles at the same temperature and for the same duration.

BRIEF DESCRIPTION OF THE FIGURES

The drawings illustrate generally, by way of example, but not by way of limitation, various aspects of the present invention.

FIG. 2A illustrates a scanning electron microscope image of silver nanoparticles synthesized in the presence of L-ascorbic acid at 50° C., in accordance with various aspects.

FIG. 2B illustrates a scanning electron microscope image of silver nanoparticles synthesized in the presence of L-ascorbic acid at 80° C., in accordance with various aspects.

FIG. 2C illustrates a scanning electron microscope image of silver nanoparticles synthesized in the presence of L-ascorbic acid at 100° C., in accordance with various aspects.

FIG. 2D illustrates a scanning electron microscope image of silver nanoparticles synthesized in the presence of L-ascorbic acid at 130° C., in accordance with various aspects.

FIG. 2E illustrates the hydrodynamic size of silver nanoparticles synthesized in the presence of L-ascorbic acid at 50° C., 80° C., 100° C. and 130° C., in accordance with various aspects.

FIG. 3A illustrates a scanning electron microscope image of silver nanoparticles synthesized in a reaction with 0 M sodium hydroxide with of silver nitrate and HEC, in accordance with various aspects.

FIG. 3B illustrates a scanning electron microscope image of silver nanoparticles synthesized in a reaction with 0.005 M sodium hydroxide with of silver nitrate and HEC, in accordance with various aspects.

FIG. 3C illustrates a scanning electron microscope image of silver nanoparticles synthesized in a reaction with 0.1 M sodium hydroxide with of silver nitrate and HEC, in accordance with various aspects.

FIG. 3D illustrates a scanning electron microscope image of silver nanoparticles synthesized in a reaction with 0.5 M sodium hydroxide with of silver nitrate and HEC, in accordance with various aspects.

FIG. 4A illustrates a scanning electron microscope image of a silver nanoparticle ink having a particle size of 196+/−98 nm at 150° C.

FIG. 4B illustrates a scanning electron microscope image of a silver nanoparticle ink having a particle size of 129+/−45 nm at 150° C., in accordance with various aspects.

FIG. 4C illustrates a scanning electron microscope image of a silver nanoparticle ink having a particle size of 80+/−27 nm at 150° C., in accordance with various aspects.

FIG. 4D illustrates a scanning electron microscope image of a silver nanoparticle ink having a particle size of 47+/−14 nm at 150° C., in accordance with various aspects.

FIG. 4E illustrates a scanning electron microscope image of a silver nanoparticle ink having a particle size of 196+/−98 nm at 200° C., in accordance with various aspects.

FIG. 4F illustrates a scanning electron microscope image of a silver nanoparticle ink having a particle size of 129+/−45 nm at 200° C., in accordance with various aspects.

FIG. 4G illustrates a scanning electron microscope image of a silver nanoparticle ink having a particle size of 80+/−27 nm at 200° C., in accordance with various aspects.

FIG. 4H illustrates a scanning electron microscope image of a silver nanoparticle ink having a particle size of 47+/−14 nm at 200° C., in accordance with various aspects.

FIG. 9A illustrates dimensions of an E-jet printed pattern, in accordance with various aspects.

FIGS. 9B-F illustrate E-jet printed patterns in the dimensions of FIG. 9A of synthesized silver nanoparticle ink having various line widths and resistances, in accordance with various aspects.

FIG. 11A illustrates an optical microscope image of dots E-jet printed using synthesized silver nanoparticle ink, in accordance with various aspects.

FIG. 11B illustrates an image of a line E-jet printed using synthesized silver nanoparticle ink, in accordance with various aspects.

FIG. 11C illustrates an image of dots E-jet printed using a commercial silver nanoparticle ink, in accordance with various aspects.

FIG. 11D illustrates an image of a line E-jet printed using a commercial silver nanoparticle ink, in accordance with various aspects.

FIG. 12A illustrates a scanning microscope image of copper nanoparticles synthesized with HEC, in accordance with various aspects.

FIG. 12B illustrates a scanning microscope image of copper nanoparticles synthesized with HEC and sodium borohydride, in accordance with various aspects.

FIG. 12C illustrates a scanning microscope image of copper nanoparticles synthesized with HEC and L-ascorbic acid, in accordance with various aspects.

FIG. 12D illustrates a scanning microscope image of copper nanoparticles synthesized with HEC and hydrazine, in accordance with various aspects.

FIG. 12E illustrates an X-ray diffraction pattern of copper nanoparticles synthesized with HEC, in accordance with various aspects.

FIG. 12F illustrates a photograph of an E-jet pattern printed from synthesized copper nanoparticle ink, in accordance with various aspects.

FIG. 13A illustrates a scanning electron microscope image of tungsten oxide nanoparticles synthesized with 0.15 g HEC, in accordance with various aspects.

FIG. 13B illustrates a scanning electron microscope image of tungsten oxide nanoparticles synthesized with 0.05 g HEC, in accordance with various aspects.

FIG. 14A illustrates a scanning electron microscope image of $BaTiO_3$ synthesized without HEC, in accordance with various aspects.

FIG. 14B illustrates a scanning electron microscope image of $BaTiO_3$ synthesized with HEC, in accordance with various aspects.

FIG. 16A illustrates an optical microscope image of an E-jet printed formulated ink including $BaTiO_3$, in accordance with various aspects.

FIG. 16B illustrates an optical microscope image of an E-jet printed synthesized $BaTiO_3$ nanoparticle ink, in accordance with various aspects.

DETAILED DESCRIPTION

Figure 1:
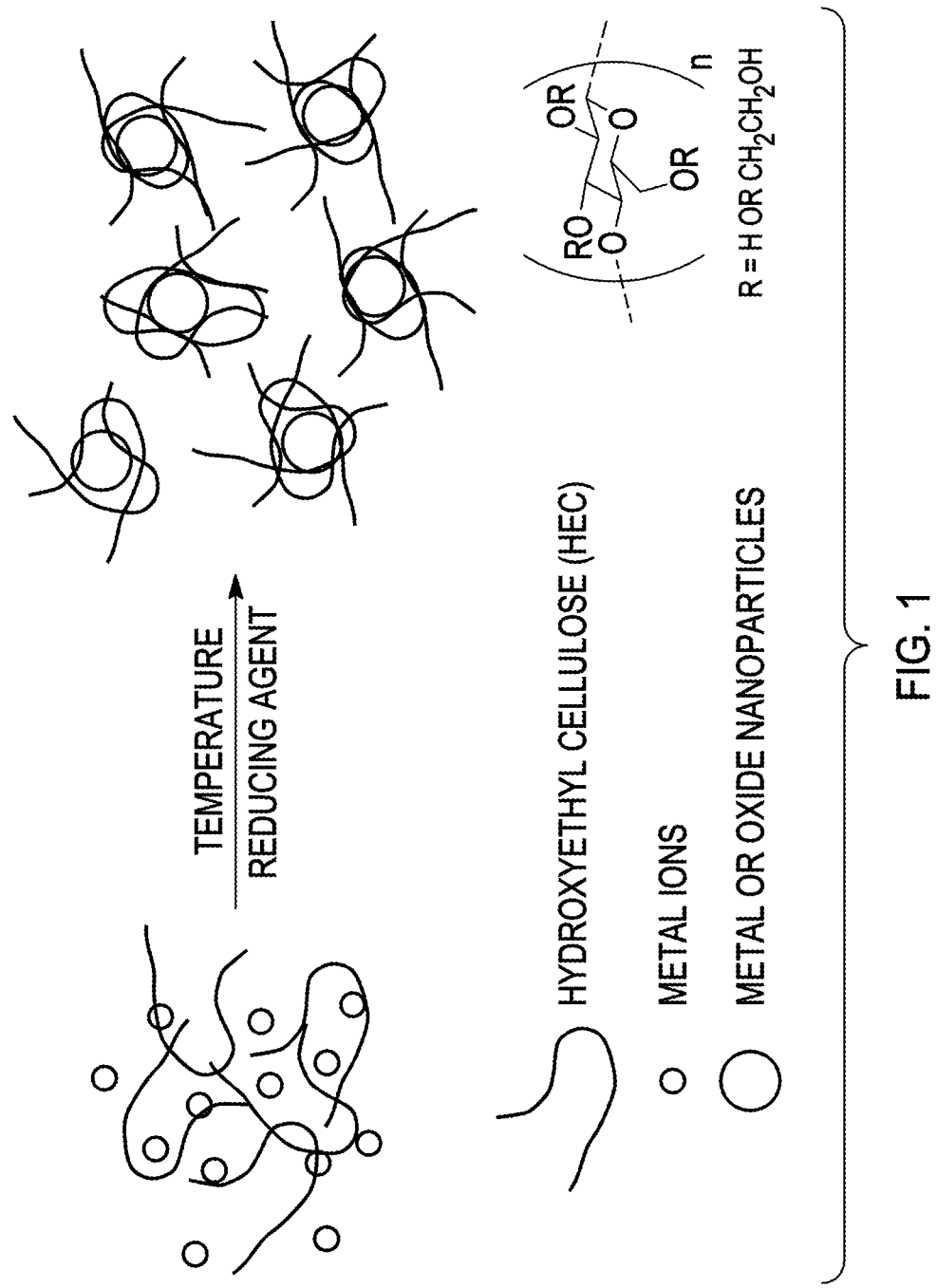
FIG. 1 illustrates a schematic diagram showing an in-situ metal nanoparticle ink synthesis with HEC, in accordance with various aspects.

Reference will now be made in detail to certain aspects of the disclosed subject matter. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in a specific order as recited herein. Alternatively, in any aspect(s) disclosed herein, specific acts may be carried out in any order without departing from the principles of the invention, except when a temporal or operational sequence is explicitly recited. Furthermore, specified acts can be carried out concurrently unless explicit claim language recites that they be carried out separately or the plain meaning of the claims would require it. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that about 0 wt % to about 5 wt % of the composition is the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

As used herein, the term "polymer" refers to a molecule having at least one repeating unit and can include copolymers.

The term "stabilize" or "stabilizing" refers to preventing agglomeration of the nanoparticles, such as by suspending the nanoparticles so they float freely in solution stabilizes without joining each other. A stable ink does not aggregate or have sedimentation.

For purposes of this disclosure, the chemical elements are identified in accordance with the Periodic Table of the Elements, CAS version, Handbook of Chemistry and Physics, 67th Ed., 1986-87, inside cover.

All patents, patent application publications, journal articles, textbooks, and other publications mentioned in the specification are indicative of the level of skill of those in the art to which the disclosure pertains. All such publications are incorporated herein by reference to the same extent as if each individual publication were specifically and individually indicated to be incorporated by reference.

Metal Nanoparticle Ink

In various aspects, the present invention provides an ink that includes metal nanoparticles stabilized with cellulose or a cellulose derivative.

The metal nanoparticles can include a metal, a metal oxide, a metal titanate, or a combination thereof, wherein the metal can include any metal, metalloid, alkali metal, or alkaline earth metal from Groups 1-16 of the periodic table. The metal nanoparticles can include a metal. The metal nanoparticles can include silver, copper, tungsten oxide, barium titanate, or a combination thereof. For example, the metal nanoparticles can be silver nanoparticles, copper nanoparticles, tungsten oxide nanoparticles, barium titanate nanoparticles, or a combination thereof. The ink can have a loading of the metal nanoparticles of 15 wt % to 75 wt %, or 20 wt % to 60 wt %, or 25 wt % to 55 wt %, or 30 wt % to 50 wt %, or less than or equal to 75 wt % and greater than or equal to 15 wt % and less than, equal to, or greater than 20 wt %, 25, 30, 35, 40, 45, 50, 55, 60, 65, or 70 wt %, based on the total weight of the ink.

The metal nanoparticles can have any suitable size or diameter, such as 20 nm to 500 nm, or 100 nm to 200 nm, or less than or equal to 500 nm and greater than or equal to 20 nm and less than, equal to, or greater than 30 nm, 40, 50, 60, 70, 80, 90, 100, 110, 120, 130, 140, 150, 160, 170, 180, 190, 200, 210, 220, 240, 260, 280, 300, 320, 340, 360, 380, 400, 420, 440, 460, or 480 nm (e.g., D50 [num], D90 [num], D99 [num], or D100 [num] particle size). The term "D50," as used herein refers to the 50th percentile number- or volume-based median particle diameter, which is the diameter below which 50% by number or volume of the particle population is found. Other percentages such as D10 (10%), D90 (90%), D99 and D100 (100%) are also commonly used. The term "D99," as used herein, refers to the 99th percentile of either a number- or volume-based median particle diameter, which is the diameter below which 99% by number or volume of the particle population is found. The number or volume measurement is indicated by [num] for number or [vol] for volume. The metal nanoparticles can have a D50 [num] particle diameter of less than about 300 nm (e.g., a D50 [num] particle diameter of about 150 nm to about 250 nm; about 175 to about 225 nm; or about 100 to about 200 μm). The metal nanoparticles can have a D90 [num] particle diameter of less than about 400 nm (e.g., a D90 [num] particle diameter of about 100 μm to about 250 μm; about 125 μm to about 275 μm; or about 150 μm to about 300 μm). The metal nanoparticles can have a D99 [num] particle diameter of less than about 500 nm (e.g., D99 [num] particle diameter of about 20 nm nm to about 400 nm; about 50 nm to about 350 nm; or about 100 nm to about 300 nm). In other aspects, the metal nanoparticles can have a D100 [num] particle diameter of less than about 600 nm (e.g., a D100 [num] particle diameter of about 5 nm to about 500 nm, about 10 nm to about 450 nm; or about 15 nm to about 400 nm). Particle diameters and particle size distributions can be determined by single particle optical sizing (SPOS) as described, for example, in U.S. Pat. No. 9,423,335, which is incorporated by reference as if fully set forth herein. Other methods for determining particle diameters and particle size distributions can also be used, including SEM, microscopy, light scattering, laser diffraction, coulter counter (electrical zone sensing), and digital image analysis. Particle sizes can be determined with or without the cellulose or cellulose derivative bound to the metal nanoparticles. The cellulose or cellulose derivative that stabilizes the metal nanoparticles can add 1 nm to 100 nm to the diameter of a nanoparticle, such as less than or equal to 100 nm and greater than or equal to 1 nm and less than, equal to, or greater than 2 nm, 3, 4, 5, 6, 7, 8, 9, 10, 12, 14, 16, 18, 20, 25, 30, 35, 40, 45, 50, 60, 70, 80, or 90 nm. In various aspects the metal nanoparticles can have a relatively homogeneous size distribution, such that the metal nanoparticles have a polydispersity index (PDS) of less than 0.2 and a size standard deviation of less than 30%.

The cellulose or cellulose derivative can at least partially coat the metal nanoparticles. The cellulose or cellulose derivative can be a bioderived agent. The cellulose or cellulose derivative can be bound to the metal nanoparticles, such as via electrostatic forces, ionic bonding, hydrogen bonding, covalent bonding, van der Waals forces, or a combination thereof. The cellulose or cellulose derivative can include —OH groups that can be bound to the metal nanoparticles. The cellulose or cellulose derivative can stabilize the metal nanoparticles by preventing or reducing their agglomeration (e.g., preventing contact between the nanoparticles) and by preventing or reducing settling of the metal nanoparticles in solution. The reduction of the metal nanoparticle precursor and the stabilization of the resulting metal nanoparticle can be simultaneous. In various aspects, in addition to the cellulose or cellulose derivative that is bound to the metal nanoparticles, the ink can further include at least some of the cellulose or cellulose derivative that is free and unbound to the metal nanoparticles. Such free cellulose or cellulose derivative can increase the viscosity of the ink. The cellulose or cellulose derivative bound to the metal nanoparticle can also influence the viscosity of the ink.

The cellulose or cellulose derivative can be any suitable cellulose or cellulose derivative. For example, the cellulose or cellulose derivative can be hydroxymethyl cellulose, hydroxymethyl methylcellulose, hydroxyethyl cellulose, hydroxyethyl methylcellulose, hydroxypropyl cellulose, hydroxypropyl methylcellulose, sodium carboxymethyl cellulose (CMC) or methyl 2-hydroxyethyl cellulose (MHEC), or a combination thereof. The cellulose or cellulose derivative can be hydroxyethyl cellulose (HEC). The cellulose or cellulose derivative can have any suitable molecular weight. For example, the cellulose or cellulose derivative can have a weight-average molecular weight ($M_w$) of 10,000 to 2,000,000, 80,000 to 1,500,000, or less than or equal to 2,000,000 and greater than or equal to 10,000 and less than, equal to, or greater than 20,000, 40,000, 60,000, 80,000, 90,000, 100,000, 120,000, 150,000, 200,000, 500,000, 750,000, 1,000,000, 1,300,000, 1,600,000, or 1,900,000. The cellulose or cellulose derivative can form any suitable proportion of the ink, such as 0.01 wt % to 40 wt %, or 0.5 wt % to 30 wt %, or 0.5 wt % to 20 wt %, or less than or equal to 40 wt % and greater than or equal to 0.01 wt % and less than, equal to, or greater than 0.05, 0.1, 0.5, 1, 2, 3, 4, 5, 6, 8, 10, 12, 14, 16, 18, 20, 22, 24, 26, 28, 30, 32, 34, 36, or 38 wt %, based on the total weight of the ink.

The ink can include any suitable mass ratio of the metal nanoparticle to the cellulose or cellulose derivative, such as 100:1 to 1:1, or 20:1 to 5:1, or less than or equal to 100:1 and greater than or equal to 1:1 and less than, equal to, or greater than 90:1, 80:1, 70:1, 60:1, 50:1, 40:1, 30:1, 20:1, 15:1, 10:1, 9:1, 8:1, 7:1, 6:1, 5:1, 4:1, 3:1, or 2:1. Increasing the amount of the cellulose or cellulose derivative relative to the amount of metal nanoparticles can increase the viscosity of the ink.

The cellulose or cellulose derivative can act as a reducing agent during the synthesis of the metal nanoparticles from a metal nanoparticle precursor. The cellulose or cellulose derivative can also act as a capping agent, viscosifier, and stabilizer for the metal nanoparticles. The cellulose or cellulose derivative can reduce the metal nanoparticle precursor to form the metal nanoparticles either as the solve reducing agent or in the presence of one or more second reducing agents. The metal nanoparticle precursor can be any suitable precursor than can be reduced to form the metal nanoparticles. The metal nanoparticle precursor can include a metal in an oxidized state. The metal nanoparticle precursor can include a metal oxide, a metal nitrate, a metal acetate, a metal citrate, a metal halide, a metal phosphate, a metal formate, a metal nitrite, a metal hydroxide, a hydrate thereof, or a combination thereof. The metal nanoparticle precursor can include a silver precursor, a barium titanate precursor, a copper precursor, a tungsten precursor, or a combination thereof. The metal nanoparticle precursor can include silver nitrate, silver acetate, silver citrate, silver formate, silver carbonate, silver fluoride, silver nitrite, silver chloride, silver bromide, silver iodide, silver phosphate, silver oxide, silver hydroxide, silver acetate hydrate, copper formate, copper carbonate, copper fluoride, copper nitrite, copper chloride, copper bromide, copper iodide, copper phosphate, copper acetate, copper citrate, copper hydroxide, copper acetate hydrate, tungsten tungstate dihydrate, barium acetate with titanium tetrachloride, or a combination thereof. The ink can include unreacted metal nanoparticle precursor, or the ink can be substantially free of the metal nanoparticle precursor (e.g., the metal nanoparticle precursor can be completely consumed during the reduction thereof, or the metal nanoparticle precursor can be removed during purification of the metal nanoparticles prior to suspending in a solvent to form the ink).

The ink can further include a second reducing agent. The second reducing agent can be any suitable reducing agent that can reduce the metal nanoparticle precursor to for the metal nanoparticles in the presence of the cellulose or cellulose derivative. The second reducing agent can include ascorbic acid, sodium borohydride, hydrazine, or a combination thereof. In other aspects, any second reducing agent used in the synthesis of the stabilized metal nanoparticles is removed during purification of the nanoparticles (e.g., via filtration from the reaction solution, and/or via other purification techniques).

The ink can further include a solvent. The solvent can be any suitable solvent. For example, the solvent can include or can be dimethyl sulfoxide (DMSO), water, ethylene glycol, triethylene glycol monomethyl ether (TGME), ethanol, acetone, butyl glycol acetate, carbitol acetate, glycol ether, ethyl glycol, dimethyl esters of adipic, glutaric, or succinic acids, or a combination thereof. In various aspects, the solvent can be a solvent with a boiling point of 100° C. or higher. The solvent can be any suitable proportion of the ink; for example, the solvent can be 20 wt % to 95 wt % of the ink, or 40 wt % to 60 wt % of the ink, or less than or equal to 95 wt % and greater than or equal to 20 wt % and less than, equal to, or greater than 25 wt %, 30, 35, 40, 45, 50, 55, 60, 65, 70, 75, 80, or 85 wt %, based on the total weight of the ink.

In various aspects, the ink can further include one or more surfactants. The surfactant can be used to adjust the surface tension of the ink to adjust its printing performance. Surfactants can be used to lower volatility, which can decrease evaporation to correspondingly decrease clogging. In aspects, the surfactant can be a Triton surfactant, such as Triton X-100, Triton X-114, Triton X-45, or combination thereof. In aspects, the surfactant can be Tween surfactants, such as Tween 20, Tween 40, Tween 60, and Tween 80, or a combination thereof.

The ink can have any suitable viscosity. For example, the ink can have a viscosity of about 100 mPa·s to about 300 mPa·s at shear rate of 1000 1/s. The ink can have a viscosity of about 50 mPa·s to about 500 mPa·s at a shear rate of 1000 1/s, or about 75 mPa·s to about 400 mPa·s at a shear rate of 1000 1/s, or about 100 mPa·s to about 300 mPa·s at a shear rate of 1000 1/s, or about 40 mPa s (35% loading, 100-200 nm particles, 20:1 HEC ratio) at a shear rate of 1000 1/s, or about 2000 mPa s (35% loading, 100-200 nm particles 3:1 HEC ratio) at a shear rate of 1000 1/s. The optimal inks for printing are generally made in the range of 100-300 mPa s at shear rate of 1000 1/s.

The ink can be shelf-stable (e.g., at standard temperature and pressure, in a sealed vial) for 1 month or more, for 4 months or more, or for 6 months or more, such that no agglomeration or precipitation of metal nanoparticles occurs, and such that no settling of metal nanoparticles occurs. Placing the ink in a refrigerated environment can even further extend the shelf life of the ink.

Various aspects of the present invention provide an ink that includes a reaction product of a composition that includes metal nanoparticle precursor, such as a silver precursor, a barium titanate precursor, a copper precursor, a tungsten precursor, or a combination thereof (e.g., silver nitrate, silver acetate, silver citrate, silver formate, silver carbonate, silver fluoride, silver nitrite, silver chloride, silver bromide, silver iodide, silver phosphate, silver oxide, silver hydroxide, silver acetate hydrate, copper formate, copper carbonate, copper fluoride, copper nitrite, copper chloride, copper bromide, copper iodide, copper phosphate, copper acetate, copper citrate, copper hydroxide, copper acetate hydrate, tungsten tungstate dihydrate, barium acetate with titanium tetrachloride, or a combination thereof). The composition also includes cellulose or a cellulose derivative (e.g., hydroxyethyl cellulose). The reaction product can be metal nanoparticles that are stabilized by the cellulose or cellulose derivative. The metal nanoparticles can be separated from the reaction mixture and suspended in a solvent to form the ink.

Method of Printing

Various aspects of the present invention provide a method of printing. The method includes printing the ink of the present invention on a substrate. For example, the method includes printing an ink that includes metal nanoparticles stabilized by cellulose or a cellulose derivative on a substrate. The printing can be any suitable printing, such as electrohydrodynamic printing. The substrate can be any suitable substrate, such as glass, polymer, quartz, silicon, cellulose acetate, cellophane, polyamide, or PET.

The method of printing can be a method of forming a sintered ink, wherein the method further includes sintering the printed ink, to form the sintered ink on the substrate. The sintered ink can be electrically conductive (e.g., silver or copper), or electrically non-conductive (e.g., barium titanate or tungsten oxide), depending on the composition of the ink. The sintering can include heating to 130° C. or higher, such as heating to 250° C. to 1000° C., or to less than or equal to 1000° C. and greater than or equal to 250° C. and less than, equal to, or greater than 300° C., 350, 400, 450, 500, 600, 700, 800, or 900° C. The sintering can include photo-sintering, laser-sintering, or a combination thereof. The sintering can be performed under air, inert gas (e.g., $N_2$, argon), vacuum, or a combination thereof.

The method of printing can be a method of forming an electrically conductive pathway, wherein the method further includes sintering the printed ink, to form the electrically conductive pathway on the substrate.

The printing can be performed under any suitable conditions. In various aspects, the printing is performed in the absence of gravity. In various aspects, the printing is performed under microgravity. As used herein, "microgravity" refers to gravity less than 1 G, including zero gravity, it can also include Martian G (⅓ Earth's gravity) and Lunar G (⅙ Earth's gravity).

Printed lines can have higher conductivity with increasing width. In various aspects, the inks described therein can be used to print small features, such as features having a size of about 3-5 μm. In various aspects, after printing and sintering, the inks described herein can have a conductivity of about 25 μΩ·cm when sintered at 150° C. for 30 minutes and of about 3 μΩ·cm when sintered at 200° C. for 30 minutes.

Method of Making Metal Nanoparticle Ink

Various aspects of the present invention provide a method of making the ink of the present invention. The method can include forming a reaction solution that includes cellulose or a cellulose derivative and a metal nanoparticle precursor to form metal nanoparticles. The method can also includes suspending the metal nanoparticles in a solvent to form the ink.

In various aspects, the method includes preparing a solution of the cellulose or cellulose derivative prior to or after adding the metal nanoparticle precursor thereto. Preparing a solution of the cellulose or cellulose derivative can include combining the cellulose or cellulose derivative with a reaction solvent and heating the solution to about, 100° C., or to about 60° C. to about 200° C., or to about 80° C., about 90° C., about 100° C., about 110° C., about 120° C., about 130° C., about 140° C., or about 150° C. Preparing the solution can further include stirring the solution during the heating until the cellulose or cellulose derivative fully dissolves (e.g., such that the solution has less than about 5 wt % undissolved cellulose or cellulose derivative, or less than 4 wt %, 3, 2, or less than about 1 wt % undissolved cellulose or cellulose derivative), such as for about 5 to about 45 minutes, for about 10 to about 40 minutes, for about 15 to about 30 minutes, or for about 20 to about 35 minutes. Preparing the solution can further including stirring the cellulose or cellulose derivative solution.

The method can further include heating the reaction solution for a suitable duration such that the reduction takes place. The heating can including heating to about 100° C. The heating can be performed for 5 minutes to 2 hours, or 10 minutes to 60 minutes, or 15 minutes to 30 minutes. The method can further include stirring the reaction solution.

The reaction solution can further include a second reducing agent. The second reducing agent can be one or more reducing agents. The second reducing agent can include ascorbic acid, sodium borohydride, hydrazine, or a combination thereof.

The reaction solution can include a base. The base can be any suitable base, such as a water-soluble hydroxide salt. The base can be potassium hydroxide, sodium hydroxide, ammonium hydroxide, lithium hydroxide, or a combination thereof. In various aspects, using a greater amount of base in the reaction solution can result in the formation of smaller metal nanoparticles. For example, in various aspects, when a concentration of the base in the reaction solution is 0.3 M to 1.0 M, the formed metal nanoparticles have a diameter of 30 nm to 80 nm (e.g., a D50 [num], D90 [num], D99 [num], or D100 [num] particle size).

The reaction solution can further include a reaction solvent. The reaction solvent can be any suitable solvent, such as ethylene glycol. The reaction solvent can include or can be dimethyl sulfoxide (DMSO), water, ethylene glycol, triethylene glycol monomethyl ether (TGME), ethanol, acetone, butyl glycol acetate, carbitol acetate, glycol ether, ethyl glycol, dimethyl esters of adipic, glutaric, or succinic acids, or a combination thereof. In various aspects, the reaction solvent can be a solvent with a boiling point of 100° C. or higher.

The method can further include separating and/or purifying the metal nanoparticles form the reaction solvent and other materials therein prior to the suspending of the metal nanoparticles in the solvent. The separation can include filtration, decantation, washing, one or more other purification techniques, or a combination thereof.

The method can further include adding cellulose or a cellulose derivative to the ink to increase viscosity thereof. Such added cellulose or cellulose derivative can be free and unbound to the metal nanoparticles.

The reaction solution can include any suitable mass ratio of the metal nanoparticle precursor to the cellulose or cellulose derivative, such as 100:1 to 1:1, or 20:1 to 5:1, or less than or equal to 100:1 and greater than or equal to 1:1 and less than, equal to, or greater than 90:1, 80:1, 70:1, 60:1, 50:1, 40:1, 30:1, 20:1, 15:1, 10:1, 9:1, 8:1, 7:1, 6:1, 5:1, 4:1, 3:1, or 2:1.

EXAMPLES

Various aspects of the present invention can be better understood by reference to the following Examples which are offered by way of illustration. The present invention is not limited to the Examples given herein.

General synthesis of metal nanoparticles. In a typical synthesis, 50 mg of 2-hydroxyethyl cellulose (HEC, Mv=90000 g/mol) was mixed with 10 g of ethylene glycol and 0.1 ml of ammonium hydroxide (28 wt %) in a 100 ml Erlenmeyer flask. The solution was stirred at 100° C. on a hot plate until the 2-hydroxyethyl cellulose was completely dissolved. Then 0.5 ml of $AgNO_3$ solution (1 g/ml) was added into the above solution. After the $AgNO_3$ solution was completely dissolved, a 1.5 ml of L-ascorbic acid solution (0.2 g/ml) was rapidly injected. The solution turned to dark brown in a few seconds, indicative of the formation of Ag nanoparticles. The reaction was stirred for 30 seconds before all the mixture was transferred into a centrifuge tube for further purification. The resulting Ag nanoparticles were collected by centrifugation and washed twice with ethanol and acetone. After purification, the Ag nanoparticles were suspended in dimethyl sulfoxide (DMSO) by ultrasonication for 30 min to form a silver ink.

General protocol for printing of metal nanoparticle ink. An E-jet printing system was employed to print Ag ink in normal and zero gravity according to our previous work (J. Micromech. Microeng. 29 (2019) 115004). A plate electrode was set on the nano-positioning platform, which was controlled precisely by programs. A high voltage was applied between the plate electrode and needle, generating a large electric field to jet out droplets for deposition and printing. The ink was printed on the glass slide as substrate, which was attached on the plate electrode. With the moving of the platform, various patterns could be fabricated via given programs. Needle size, stand-off distance, voltage modalities, and plotting speed were optimized. A charge coupled device (CCD) camera, as well as a lens system, were employed to monitor the needle and printed patterns. In a typical printing process in normal gravity, a glass needle with an inner diameter of ~100 μm was used. Stand-off distance was controlled as 120 μm. Voltage with frequency of 100 Hz, amplitude of 1800 V and duty ratio of 40% was applied. Plotting speed was set as 2.5 mm/s. The printing parameters in zero gravity were almost identical except that a ~600 V higher voltage was applied.

Example 1

Silver Nanoparticle Ink

The synthesis of functional inks (e.g., silver, copper, tungsten oxide, barium titanate) is based on the colloidal chemical reduction in the presence of hydroxyethyl cellulose (HEC). HEC is a key molecule in the synthesis, which acts as the reducing agent, capping agent, stabilizer, and viscosity modifier. FIG. 1 illustrates a schematic diagram showing an in-situ metal nanoparticle ink synthesis with HEC. The hydroxyl group on the HEC backbones provide the reducing ability for the ink synthesis. It possesses strong binding affinity towards metal and oxide surfaces, which is beneficial for nanoparticle stabilization. The network structure of HEC also helps prevent nanoparticles from aggregation. In addition, HEC is a polysaccharide derivative widely used as thickening and gelling agent in industry. The amount of HEC in the ink can be finely tuned to get a compatible rheology for E-jet printing. Therefore, HEC can play multiple roles to determine the scalable and cost-effective synthesis of highly stable functional inks for E-jet printing.

The synthesis resulted in highly stable silver inks for E-jet printing. It was controlled by temperature, pH, and an additional reducing agent. As shown in FIGS. 2A-E, hydrodynamic size of silver nanoparticles was tuned from 200 to 400 nm by varying the reaction temperature from 20 to 130° C. In the synthesis, an additional reducing agent of L-ascorbic acid was used to boost the reduction reaction and enhance the yield of nanoparticles. The reaction was completed within 1 minute with a yield of nearly 100%. The synthesis can be easily scaled up without affecting the quality of the ink. Such advantages make the method very promising and competitive for industry-level ink synthesis.

It has been discovered that during the synthesis process of the silver nanoparticle ink, a high level of control over the nanoparticle size is achieved by adjusting the concentration of base content in the synthesis, which changes the pH level of the synthesis. FIGS. 3A-D shows SEM images of silver nanoparticles produced from performing the synthesis with NaOH concentrations of 0, 0.005, 0.1, and 0.5 M in 25 mL of solvent (10 mL water+15 mL ethylene glycol) with 3.0 g of silver nitrate ($AgNO_3$) and 0.20 g of HEC ($M_w$=90000). It is shown that as NaOH concentration increases, the average size of the particles decreases, ranging from 196±98 nm at 0 M NaOH to 47±14 nm at 0.5 M NaOH. The size distribution of the particles also becomes narrower as they get smaller. The same trend was observed with ammonium hydroxide as the base, and it is reasonable to conclude that this should be consistent for other bases that raise the pH of the synthesis.

It was discovered that when made by this procedure, the smaller particles showed better sintering when heated, e.g., more "fusion" between particles. FIGS. 4A-H shows SEM images of the four different particle sizes when sintered at 150° C. and 200° C. for 30 minutes. At both temperatures, smaller particles show a higher degree of sintering than larger particles. Smaller particles were also found to show signs of sintering at lower temperatures than larger particles, and to sinter faster than larger particles at the same temperature.

Figure 5A:
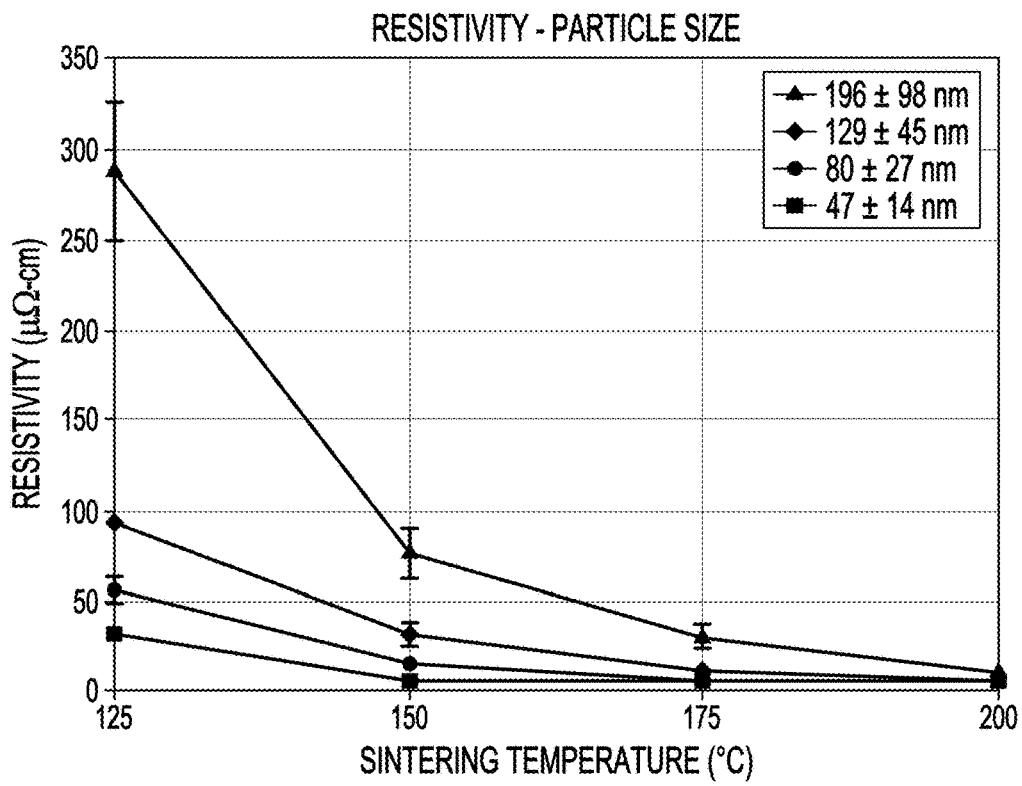
FIG. 5A illustrates resistivity versus sintering temperature for silver inks having various particle sizes, in accordance with various aspects.
Figure 5B:
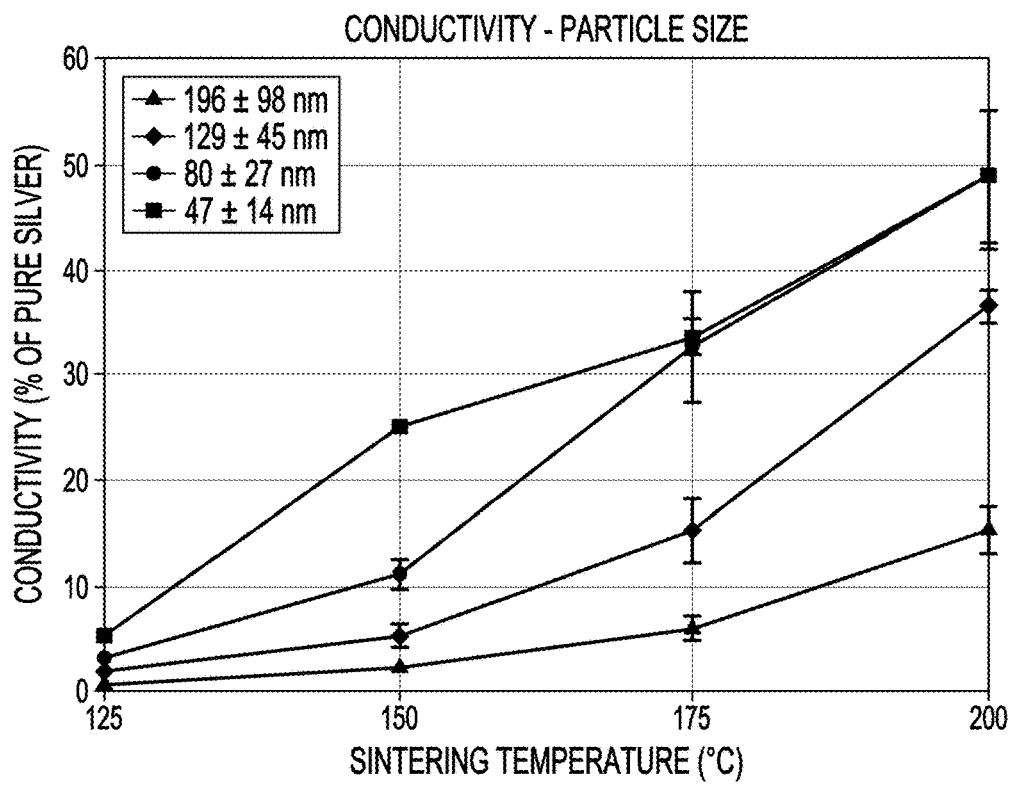
FIG. 5B illustrates conductivity versus sintering temperature for silver inks having various particle sizes, in accordance with various aspects.

The effects of sintering are directly reflected by the electrical conductivity achieved by the inks of the different particle sizes. Thin films of the inks were sintered at 125° C., 150° C., 175° C., and 200° C. for 30 minutes, and their electrical resistivity was evaluated using a four-point probe. FIG. 5A shows the resistivities of each particle size at each temperature, and FIG. 5B shows their conductivities (1/resistivity) given as a percentage of the conductivity of bulk silver. It can be seen that at each temperature, smaller particles are more conductive (less resistive) than larger particles.

Figure 6:
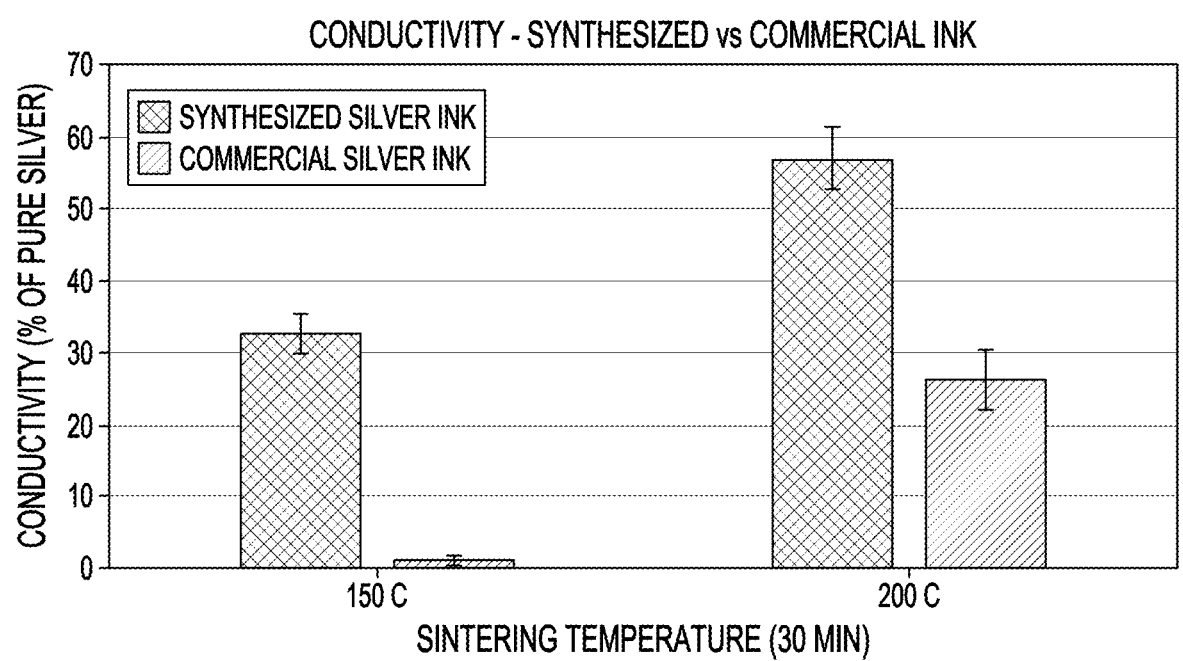
FIG. 6 illustrates conductivity of a synthesized silver nanoparticle ink compared to that of a commercially purchased silver ink when sintered at 150° C. or 200° C., in accordance with various aspects.

With this knowledge, the inks can be optimized for conductivity. As shown in FIG. 6, the optimally synthesized silver inks were found to have conductivities of 32.6% and 56.9% that of bulk silver when sintered at 150° C. and 200° C. respectively for 30 minutes. By comparison, the commercial silver ink purchased from Sigma Aldrich was found to have conductivities of 0.8% and 26.2% that of pure silver when sintered at 150° C. and 200° C. respectively for 30 minutes.

Figure 7B:
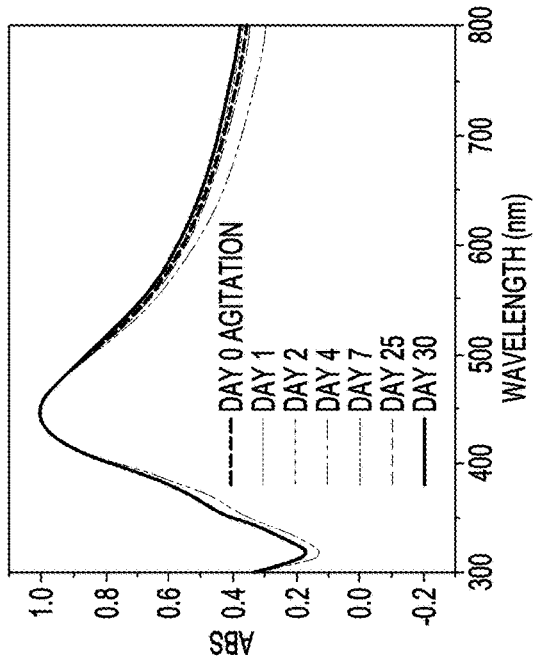
FIG. 7B illustrates UV-vis spectra of sample (3) from FIG. 7A stored for various durations, in accordance with various aspects.
Figure 7C:
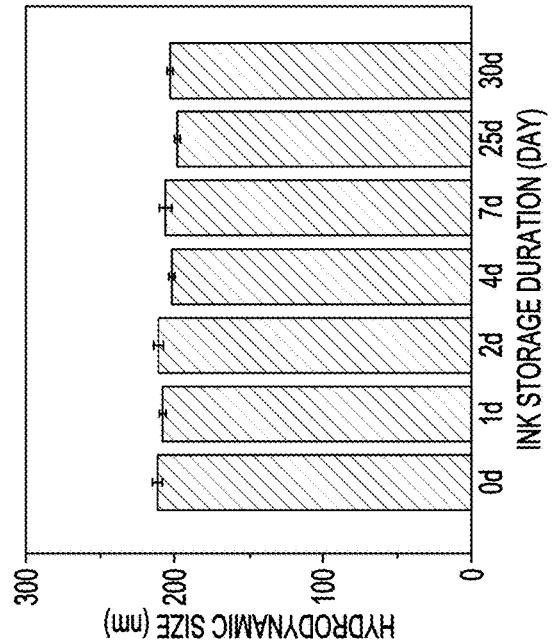
FIG. 7C illustrates hydrodynamic size of silver nanoparticles of sample (3) from FIG. 7A stored for various durations, in accordance with various aspects.
Figure 7A:
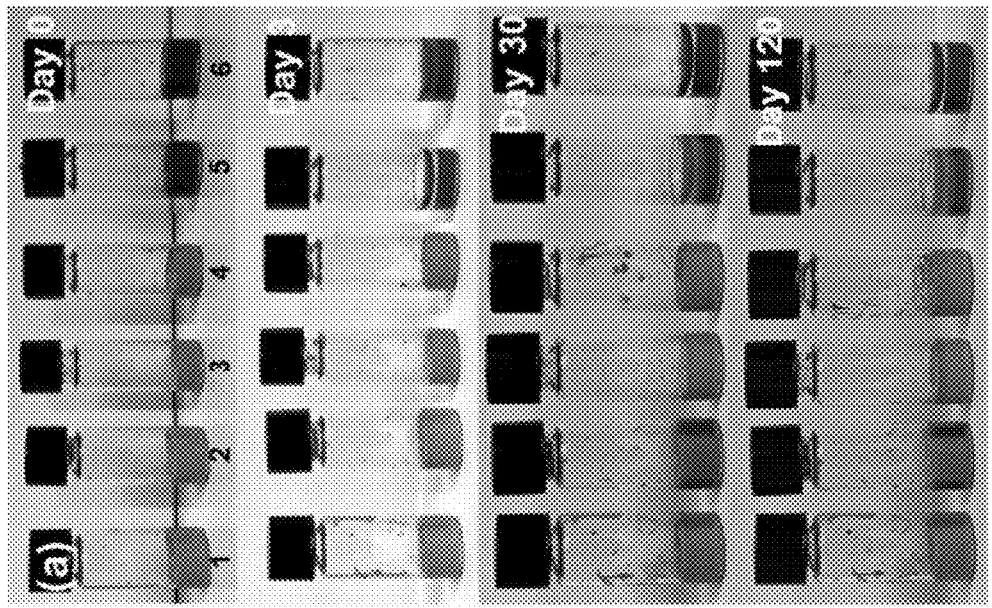
FIG. 7A illustrates photographs of silver inks stored for 0, 8, 30, and 120 days, with ink (1) being commercial ink (as received, 50 wt % Ag loading), (2) commercial ink diluted to 35 wt % Ag loading, (3) synthesized silver nanoparticle ink with 35 wt % Ag loading, (4) synthesized silver nanoparticle ink with 35 wt % Ag loading and 2 wt % surfactant, (5) formulated ink with silver nanoparticles, HEC ($M_w$=90K), and dimethyl sulfoxide, and (6) formulated ink with silver nanoparticles, HEC ($M_w$=1.3M), and dimethyl sulfoxide, in accordance with various aspects.

Due to the superior ability of HEC to stabilize nanoparticles, the synthesized ink showed long shelf-life, which was assessed by the sedimentation over a long period of time. UV-vis spectroscopy and dynamic light scattering were used to examine the nanoparticle aggregation. FIG. 7A shows the photographs of a series of silver inks stored for different durations. After 120 days, the synthesized ink (sample 3) did not show any obvious sedimentation, which is comparable to benchmark silver ink (sample 2) from Sigma-Aldrich. There was no detectable aggregation of silver nanoparticles over 30 days according to UV-vis spectra and hydrodynamic size analysis. More interestingly, the synthesized ink exhibited much better stability than formulated ink (samples 5 and 6), which was prepared by mixing the same amount of HEC, commercial silver nanopowder, and dimethyl sulfoxide. The formulated ink lost its stability in 3 days. The results indicate the essential role of HEC in nanoparticle stabilization, which ensures long shelf-life of synthesized silver ink. FIG. 7B illustrates UV-vis spectra of sample (3) from FIG. 7A stored for various durations. FIG. 7C illustrates hydrodynamic size of silver nanoparticles of sample (3) from FIG. 7A stored for various durations.

The amount of HEC used in the particle synthesis was found to be very effective in controlling the viscosity of the resulting ink. The amount of HEC used is measured by its weight ratio with silver nitrate ($AgNO_3$) in the synthesis.

Figure 8A:
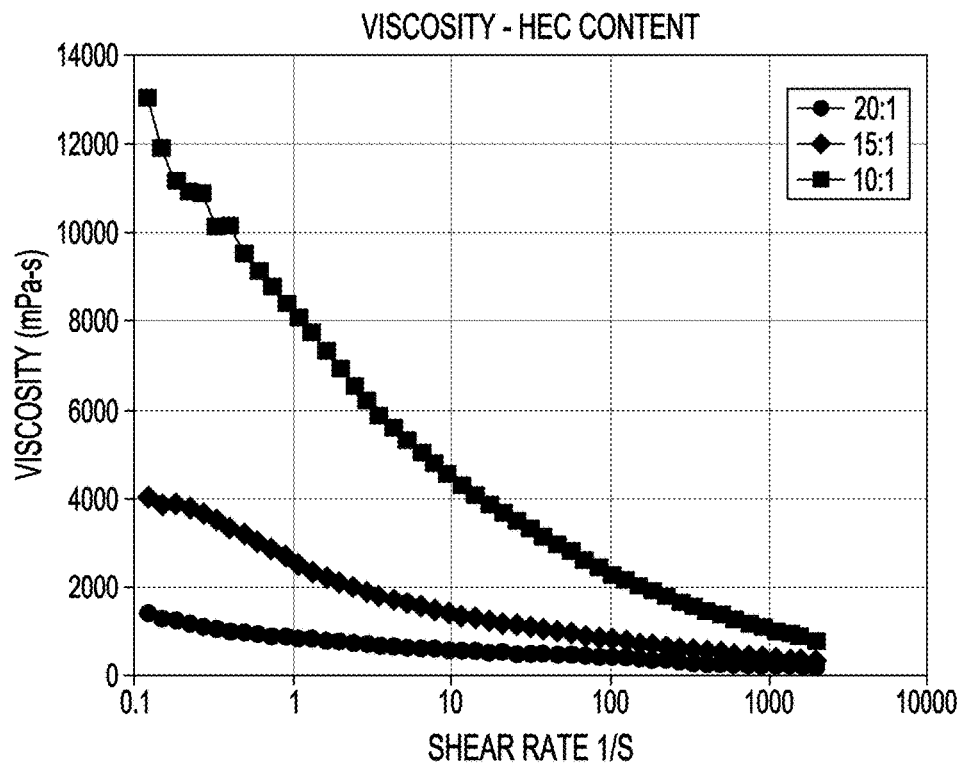
FIG. 8A illustrates viscosity versus shear rate for silver inks synthesized with various ratios of $AgNO_3$:HEC, in accordance with various aspects.
Figure 8B:
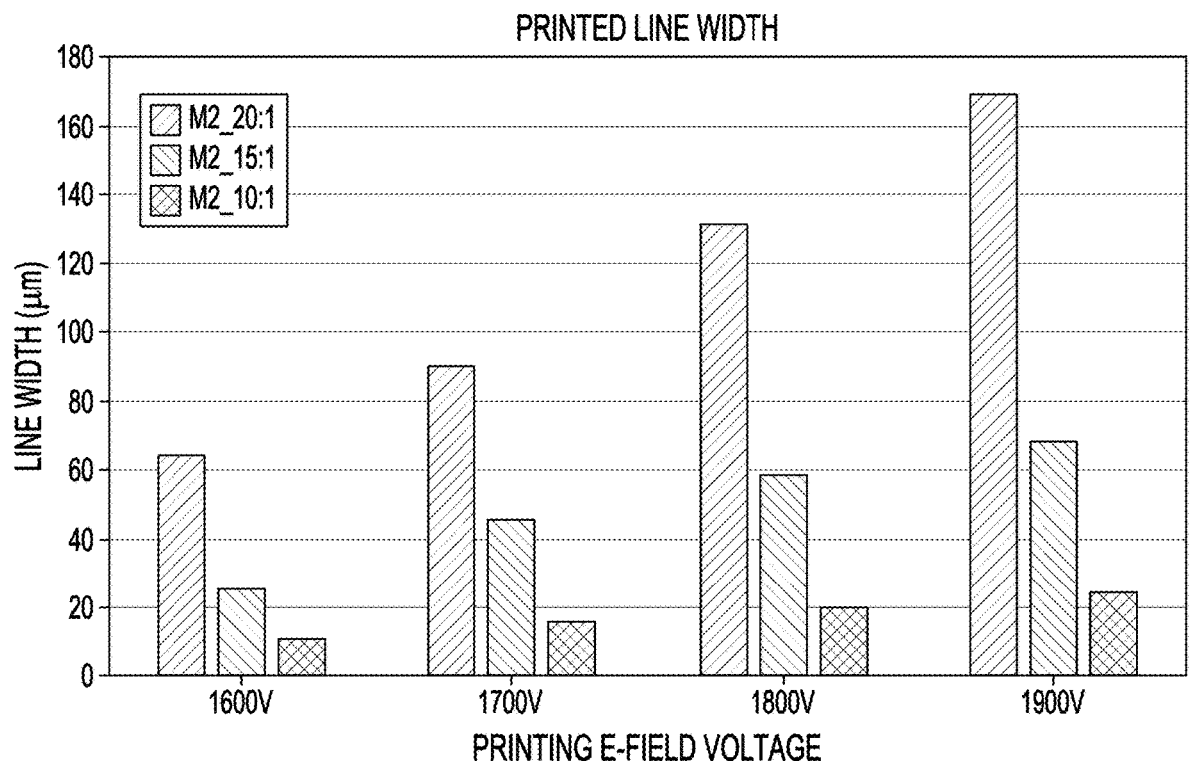
FIG. 8B illustrates printed line widths of the inks from FIG. 8A printed at various E-field voltages of 1600-1900 V, in accordance with various aspects.

FIG. 8A shows the viscosity vs shear rate of silver inks with AgNO$_3$:HEC ratios of 20:1 (0.15 g HEC), 15:1 (0.20 g HEC), and 10:1 (0.30 g HEC) made with 3.0 g of AgNO$_3$. All inks were loaded to 50 wt % solids. Inks with higher HEC content showed to have higher viscosities than those with lower HEC content. The inks also show shear-thinning behavior. It was found that the viscosity of the ink directly affects the behavior of E-jet printing. FIG. 8B shows the resulting line widths of these inks printed under E-field voltages of 1600-1900 V with all other parameters held the same. Inks with higher viscosity were found to print narrower lines than inks with lower viscosity. Increasing the E-field voltage also increases the printed line width for each ink.

The synthesized silver ink presented excellent printability for E-jet printing. As shown in FIG. 9, a circuit with a total length of 22.1 mm was designed and printed. The printing was smooth, and the line width was effectively tuned by printing parameters, including voltage, duty ratio, and plotting speed. The printed circuit was then sintered at 300° C. for 10 min. All the circuits with different line widths were highly conductive with tunable resistance. The results indicate great potential of synthesized silver inks for the fabrication of functional electronics by E-jet printing.

Figures 10A, 10B:
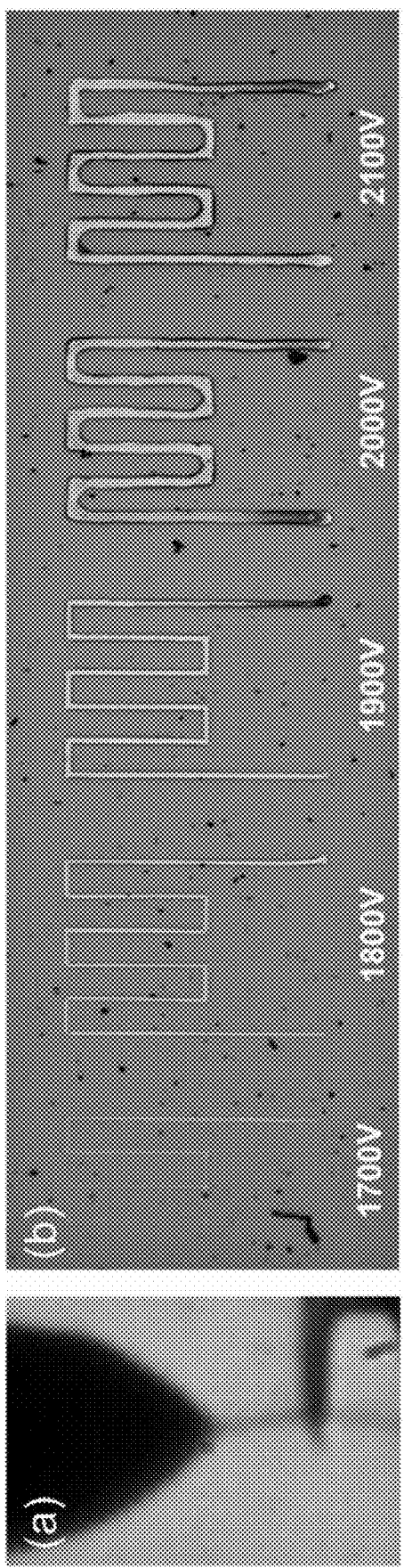
FIG. 10A illustrates a high-speed camera image of silver nanoparticle ink subjected to an E-jet process in zero gravity, in accordance with various aspects.
FIG. 10B illustrates images of E-jet printed silver nanoparticle ink which was printed under zero gravity at various voltages of 1700-2100 V, in accordance with various aspects.

Moreover, the synthesized silver ink could be E-jet printed with high quality in zero gravity. Images acquired by high-speed camera (FIG. 10A) showed that the jetting process was stable without gravity. A larger voltage is needed to compromise the absence of gravity. Smooth circuits were printed with their line width easily controlled by voltage (FIG. 10B). The printing in zero gravity clearly demonstrated the high quality of the synthesized silver ink.

The synthesized silver ink is also capable of being E-jet printed at very high resolution. Using a nozzle with a diameter of 100 μm, synthesized ink with a silver loading of 50 wt % was used to print uniform dots with diameters of 3 μm, and smooth, uniform lines with a width of 4 μm (FIGS. 11A-B). By comparison, the highest resolution obtained by the commercial silver ink (50 wt %) using a 100 μm diameter nozzle was much lower, consisting of dots with a diameter of 100 μm and lines with a width of 140 μm (FIGS. 7C-D). The resolution of the HEC silver nanoparticle ink was approximately ~30× higher than the commercial ink.

Example 2

Copper Nanoparticle Ink

Copper ink as a lower cost alternative to silver ink was also synthesized by a similar chemical reduction method in the presence of HEC, using copper nanoparticle precursors copper hydroxide, copper acetate, and copper acetate hydrate. HEC was found to adhere strongly to the surface of copper nanoparticles (FIG. 12A), contributing to the stabilization and viscosity of copper ink for the printing. Particle size was readily controlled from 20 to 600 nm by the reducing agents including L-ascorbic acid, hydrazine, and sodium borohydride (FIGS. 12B-D). The synthesized copper nanoparticles showed high purity, as examined by X-ray diffraction (FIG. 12E). Smooth circuits were successfully fabricated by E-jet printing, indicating great potential of copper ink for conductive electronics (FIG. 12F).

Example 3

Barium Nanoparticle Ink and Tungsten Nanoparticle Ink

Our method utilizing HEC is not limited to metal ink synthesis. Experiments resulting in the synthesis of tungsten (IV) oxide (WO$_2$) and barium titanate (BaTiO$_3$) demonstrate the ability of HEC to control the size and morphology of particles. Barium titanate and tungsten oxide can be used, for example, to make sensors such as humidity sensors. WO$_2$ was produced through a reaction of sodium tungstate dihydrate and sodium borohydride in water while BaTiO$_3$ was produced through a reaction of titanium tetrachloride, barium acetate, and sodium hydroxide. With the synthesis of WO$_2$, changes to the size and morphology of produced particles were observed when adjusting the concentration of HEC (M$_w$=90000) added to the synthesis procedure. In a 30 mL sample, the increase from 0.05 g to 0.15 g of HEC showed both a reduction in size of the particles and a shift from particles with an uneven and random shape at points to a particle with a more refined, spherical morphology (FIG. 13).

Due to the high dielectric constant of barium titanate, this ink may be applied to the on-demand printing of capacitors and humidity sensors. Our development of barium titanate ceramic ink systems has been successfully shown to produce particles of a greater level of homogeneity, improved packing from ball milled formulated ink, better resolution with less spraying during printing, and greatly increased estimated shelf life.

Barium titanate is produced through the decomposition of titanium tetrachloride in water to produce titanium dioxide with a basic solution of barium acetate, water, and sodium hydroxide diffusing and decomposing into the structure to form the final product. To further increase the dielectric constant of barium titanate, during the reaction, the barium titanate is doped with lanthanum which is introduced by dissolving lanthanum (III) oxide in nitric acid. Key to the final ink produced is the use of the biopolymer, hydroxyethyl cellulose (HEC) which serves as a capping agent for the particles in this reaction and is introduced to the reaction by stirring and slowly dissolving in a lightly basic solution of water and sodium hydroxide. HEC provides stability and prevents aggregation and sedimentation of the particles in solution through networking between particles to produce a shear thinning gel.

A difference was observed in the synthesis performed without the addition of HEC and one with the addition of HEC. FIG. 14A illustrates a scanning electron microscope image of BaTiO$_3$ synthesized without HEC. FIG. 14B illustrates a scanning electron microscope image of BaTiO$_3$ synthesized with 0.65 g of HEC added to a 50 mL reaction which resulted in a greater level of homogeneity of the obtained particles, demonstrating a certain level of control on the particle morphology through the introduction of HEC into the reaction.

Figure 15:
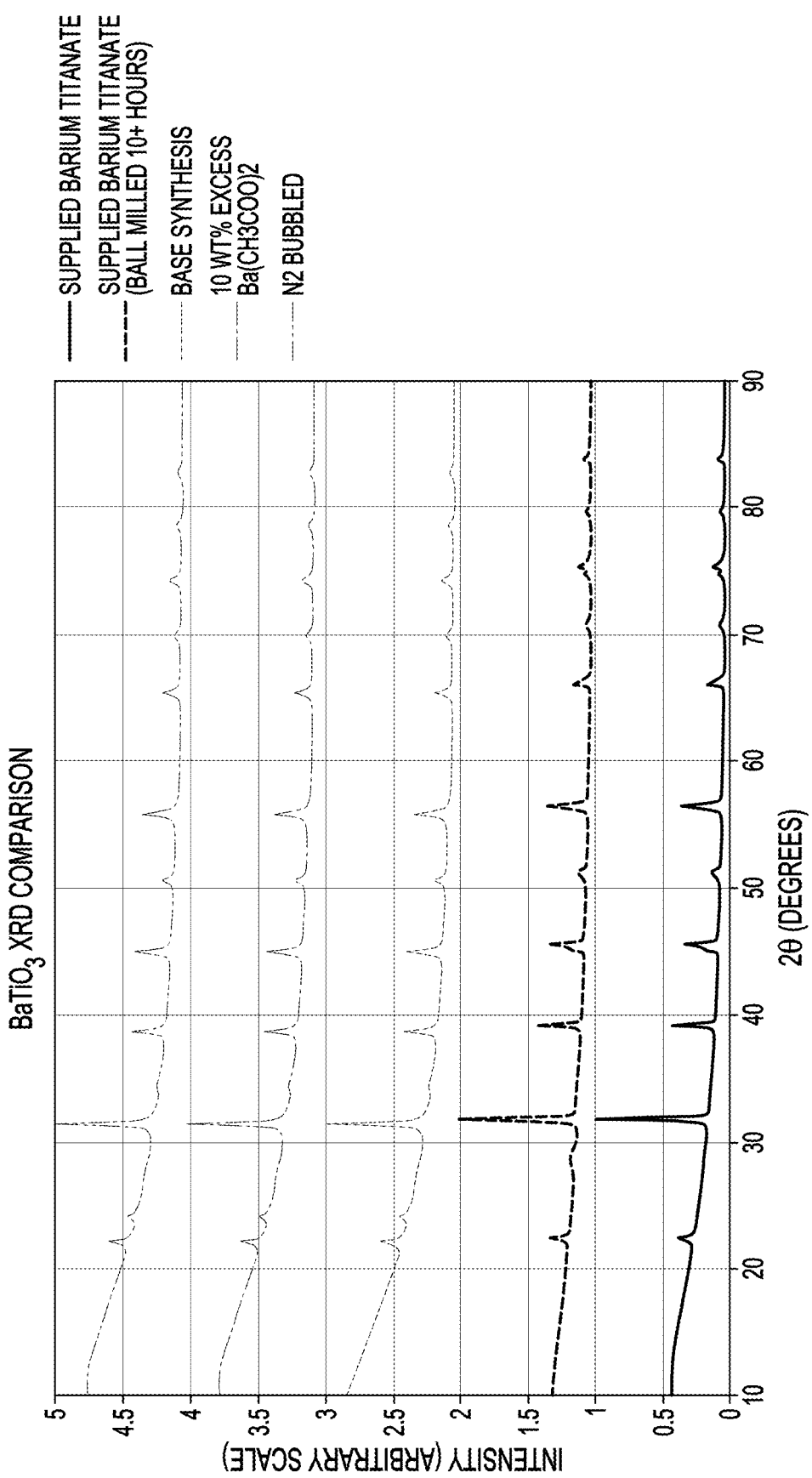
FIG. 15 illustrates X-ray diffraction patterns of supplied barium titanates compared to various synthesized barium titanates, in accordance with various aspects.

X-ray diffraction (XRD) was performed (FIG. 15) in order to determine the crystal structure of the synthesized barium titanate. Results showed that a similar structure was achieved compared to the previous barium titanate that was used in the production of formulated ink samples.

Obtaining a higher level of homogeneity with a synthesized ink can lead to a superior printed pattern versus the case of a formulated ink as synthesizing the ink provides a higher level of control over the particle morphology. This in turn leads to better quality printed patterns with the particles being more densely packed with fewer gaps. FIGS. 16A-B demonstrate the improved printing of synthesized barium titanate (FIG. 16B) versus formulated ink (FIG. 16A). The formulated ink showed spraying and had significant gaps in the pattern vs. the synthesized ink which formed a more uniform and homogenous pattern without gaps.

Furthermore, the addition of HEC during the synthesis of the barium titanate nanoparticles shows steps towards improving the stability of a suspension of these nanoparticles such that an extended shelf life can be achieved. The product of the reaction is a shear thinning gel that can be EHD printed. This ink forms into a gel when left undisturbed, contributing to its significantly increased shelf-life when compared to a formulated ink as show in Table 1.

TABLE 1

Shelf-life of barium titanate synthesized inks versus formulated inks when subjected to a heat aging test.

| | Description | $BaTiO_3$ | Heat aging (60° C.) simulated time until separation (weeks) |
|---|---|---|---|
| Formulated inks | Base formulation | 40.0 | 9.1 |
| | Increased solids | 45.0 | 9.1 |
| | Increased N22 ethyl cellulose | 40.0 | 4.6 |
| | Increase surfactant | 40.0 | 11.4 |
| Synthesized inks | 0.9 wt % synthesis HEC | 40.0 | 48 |
| | 0.9 wt % synthesis HEC, increased surfactant | 40.0 | 48 |
| | 1.3 wt % synthesis HEC | 40.0 | 48 |
| | 1.3 wt % synthesis HEC, increased surfactant | 40.0 | 48 |

The terms and expressions that have been employed are used as terms of description and not of limitation, and there is no intention in the use of such terms and expressions of excluding any equivalents of the features shown and described or portions thereof, but it is recognized that various modifications are possible within the scope of the aspects of the present invention. Thus, it should be understood that although the present invention has been specifically disclosed by specific aspects and optional features, modification and variation of the concepts herein disclosed may be resorted to by those of ordinary skill in the art, and that such modifications and variations are considered to be within the scope of aspects of the present invention.

Exemplary Aspects

The following exemplary aspects are provided, the numbering of which is not to be construed as designating levels of importance:

Aspect 1 provides an ink comprising:
metal nanoparticles stabilized with cellulose or a cellulose derivative.

Aspect 2 provides the ink of Aspect 1, wherein the metal nanoparticles comprise a metal (e.g., any metal, metalloid, alkali metal, or alkaline earth metal from Groups 1-16 of the periodic table), a metal oxide, a metal titanate, or a combination thereof.

Aspect 3 provides the ink of any one of Aspects 1-2, wherein the metal nanoparticles comprise a metal.

Aspect 4 provides the ink of any one of Aspects 1-3, wherein the metal nanoparticles comprise silver, copper, tungsten oxide, barium titanate, or a combination thereof.

Aspect 5 provides the ink of any one of Aspects 1-4, wherein the cellulose or cellulose derivative at least partially coats the metal nanoparticles.

Aspect 6 provides the ink of any one of Aspects 1-5, wherein the cellulose or cellulose derivative is bound to the metal nanoparticles.

Aspect 7 provides the ink of Aspect 6, wherein at least some of the cellulose or cellulose derivative is free and unbound to the metal nanoparticles.

Aspect 8 provides the ink of any one of Aspects 1-7, wherein the cellulose or cellulose derivative comprises hydroxyethyl cellulose.

Aspect 9 provides the ink of any one of Aspects 1-8, wherein the cellulose or cellulose derivative is a reducing agent for the synthesis of the metal nanoparticles from a metal nanoparticle precursor.

Aspect 10 provides the ink of Aspect 9, wherein the metal nanoparticle precursor comprises a metal in an oxidized state.

Aspect 11 provides the ink of any one of Aspects 9-10, wherein the metal nanoparticle precursor comprises a metal oxide, a metal nitrate, a metal acetate, a metal citrate, a metal halide, a metal phosphate, a metal formate, a metal nitrite, a metal hydroxide, a hydrate thereof, or a combination thereof.

Aspect 12 provides the ink of any one of Aspects 9-11, wherein the metal nanoparticle precursor comprises a silver precursor, a barium titanate precursor, a copper precursor, a tungsten precursor, or a combination thereof.

Aspect 13 provides the ink of any one of Aspects 9-12, wherein the metal nanoparticle precursor comprises silver nitrate, silver acetate, silver citrate, silver formate, silver carbonate, silver fluoride, silver nitrite, silver chloride, silver bromide, silver iodide, silver phosphate, silver oxide, silver hydroxide, silver acetate hydrate, copper formate, copper carbonate, copper fluoride, copper nitrite, copper chloride, copper bromide, copper iodide, copper phosphate, copper acetate, copper citrate, copper hydroxide, copper acetate hydrate, tungsten tungstate dihydrate, barium acetate with titanium tetrachloride, or a combination thereof.

Aspect 14 provides the ink of any one of Aspects 9-13, wherein the ink is substantially free of the metal nanoparticle precursor.

Aspect 15 provides the ink of any one of Aspects 1-14, further comprising a second reducing agent.

Aspect 16 provides the ink of Aspect 15, wherein the second reducing agent comprises ascorbic acid, sodium borohydride, hydrazine, or a combination thereof.

Aspect 17 provides the ink of any one of Aspects 1-16, further comprising a solvent.

Aspect 18 provides the ink of Aspect 17, wherein the solvent comprises dimethyl sulfoxide.

Aspect 19 provides the ink of any one of Aspects 1-18, wherein the ink has a viscosity of about 100 mPa·s to about 300 mPa·s at shear rate of 1000 1/s.

Aspect 20 provides the ink of any one of Aspects 1-19, wherein the metal nanoparticles have a diameter of 20 nm to 500 nm.

Aspect 21 provides the ink of any one of Aspects 1-20, wherein the metal nanoparticles have a diameter of about 100 nm to about 200 nm.

Aspect 22 provides the ink of any one of Aspects 1-21, wherein the ink is shelf-stable for 1 month or more.

Aspect 23 provides the ink of any one of Aspects 1-22, wherein the ink is shelf-stable for 6 months or more.

Aspect 24 provides an ink comprising a reaction product of a composition comprising:
a silver precursor, a barium titanate precursor, a copper precursor, a tungsten precursor, or a combination thereof; and
cellulose or a cellulose derivative.

Aspect 25 provides an ink comprising a reaction product of a composition comprising:

silver nitrate, silver acetate, silver citrate, copper hydroxide, copper acetate, copper acetate hydrate, tungsten tungstate dihydrate, barium acetate with titanium tetrachloride, or a combination thereof; and hydroxyethyl cellulose.

Aspect 26 provides a method of printing, the method comprising:

printing the ink of any one of Aspects 1-25 on a substrate.

Aspect 27 provides a method of forming a sintered ink, the method comprising:

printing the ink of any one of Aspects 1-25 on a substrate; and sintering the printed ink, to form the sintered ink on the substrate. The sintered ink can be electrically conductive or electrically non-conductive, depending on the composition of the ink.

Aspect 28 provides a method of forming an electrically conductive pathway, the method comprising:

printing the ink of any one of Aspects 1-25 on a substrate; and sintering the printed ink, to form the electrically conductive pathway on the substrate.

Aspect 29 provides the method of Aspect 28, wherein the printing is conducted in the absence of gravity.

Aspect 30 provides the method of Aspect 29, wherein the printing is electrohydrodynamic printing.

Aspect 31 provides the method of any one of Aspects 28-30, wherein the sintering comprises heating to 130° C. or higher.

Aspect 32 provides the method of any one of Aspects 28-31, wherein the sintering comprises heating to 130° C. to 1000° C.

Aspect 33 provides a method of making the ink of any one of Aspects 1-25, the method comprising:

forming a reaction solution comprising cellulose or a cellulose derivative and a metal nanoparticle precursor to form the metal nanoparticles; and suspending the metal nanoparticles in a solvent to form the ink.

Aspect 34 provides the method of Aspect 33, further comprising heating the reaction solution.

Aspect 35 provides the method of Aspect 34, wherein the heating comprises heating to about 100° C.

Aspect 36 provides the method of any one of Aspects 34-35, wherein the heating comprises heating for about 10 minutes to about 60 minutes.

Aspect 37 provides the method of any one of Aspects 34-36, wherein the heating comprises heating for about 15 minutes to about 30 minutes.

Aspect 38 provides the method of any one of Aspects 33-37, further comprising stirring the reaction solution.

Aspect 39 provides the method of any one of Aspects 33-38, wherein the reaction solution further comprises a second reducing agent.

Aspect 40 provides the method of any one of Aspects 33-39, wherein the reaction solution further comprises a base.

Aspect 41 provides the method of Aspect 40, wherein the base comprises potassium hydroxide, sodium hydroxide, ammonium hydroxide, lithium hydroxide, or a combination thereof.

Aspect 42 provides the method of Aspect 40, wherein a concentration of the base in the reaction solution is 0.3 M to 1.0 M, and wherein the formed metal nanoparticles have a diameter of 30 nm to 80 nm.

Aspect 43 provides the method of any one of Aspects 33-42, wherein the solvent further comprises a surfactant.

Aspect 44 provides the method of any one of Aspects 33-43, wherein the reaction solution comprises a reaction solvent.

Aspect 45 provides the method of Aspect 44, wherein the reaction solvent comprises ethylene glycol.

Aspect 46 provides the method of any one of Aspects 44-45, further comprising separating the metal nanoparticles from the reaction solvent prior to the suspending of the metal nanoparticles in the solvent.

Aspect 47 provides the method of any one of Aspects 33-46, further comprising purifying the metal nanoparticles prior to the suspending of the metal nanoparticles in the solvent.

Aspect 48 provides the method of any one of Aspects 33-47, wherein a mass ratio of the metal nanoparticle precursor to the cellulose or cellulose derivative is 100:1 to 1:1.

Aspect 49 provides the method of any one of Aspects 33-48, wherein a mass ratio of the metal nanoparticle precursor to the cellulose or cellulose derivative is 20:1 to 5:1.

Aspect 50 provides the method of any one of Aspects 33-49, wherein the cellulose or cellulose derivative has a weight-average molecular weight ($M_w$) of 10,000 to 2,000,000.

Aspect 51 provides the method of any one of Aspects 33-50, wherein the cellulose or cellulose derivative has a weight-average molecular weight ($M_w$) of 80,000 to 1,500,000.

Aspect 52 provides the ink or method of any one or any combination of Aspects 1-51 optionally configured such that all elements or options recited are available to use or select from.

The invention claimed is:

1. An ink comprising:
metal nanoparticles stabilized with cellulose or a cellulose derivative that are a product of reducing a metal nanoparticle precursor with a reducing agent comprising the cellulose or cellulose derivative, wherein the cellulose or cellulose derivative at least partially coats the metal nanoparticles and is bound to the metal nanoparticles;
wherein the cellulose or cellulose derivative is 12 wt % to 40 wt % of the ink, and the ink has a mass ratio of the metal nanoparticles to the cellulose or cellulose derivative of 5:1 to 20:1.

2. The ink of claim 1, wherein the metal nanoparticles comprise a metal, a metal oxide, a metal titanate, or a combination thereof.

3. The ink of claim 1, wherein the metal nanoparticles comprise silver, copper, tungsten oxide, barium titanate, or a combination thereof.

4. The ink of claim 1, wherein the cellulose or cellulose derivative comprises hydroxyethyl cellulose.

5. The ink of claim 1, further comprising a solvent comprising dimethyl sulfoxide.

6. The ink of claim 1, wherein the ink has a viscosity of about 100 mPa·s to about 300 mPa·s at shear rate of 1000 1/s.

7. The ink of claim 1, wherein the metal nanoparticles have a diameter of 20 nm to 500 nm.

8. The ink of claim 1, wherein the ink is shelf-stable for 1 month or more.

9. An ink comprising metal nanoparticles that are a reaction product of a composition comprising:
   a silver precursor, a barium titanate precursor, a copper precursor, a tungsten precursor, or a combination thereof; and
   a reducing agent comprising cellulose or a cellulose derivative;
   wherein the cellulose or cellulose derivative is 12 wt % to 40 wt % of the ink, and the ink has a mass ratio of the metal nanoparticles to the cellulose or cellulose derivative of 5:1 to 20:1.

10. A method of printing, the method comprising:
    printing the ink of claim 1 on a substrate.

11. A method of forming a sintered ink, the method comprising:
    printing the ink of claim 1 on a substrate; and
    sintering the ink, to provide the sintered ink on the substrate.

12. A method of forming an electrically conductive pathway, the method comprising:
    printing the ink of claim 1 on a substrate; and
    sintering the printed ink, to form the electrically conductive pathway on the substrate.

13. A method of making the ink of claim 1, the method comprising:
    reacting the metal nanoparticle precursor with a reducing agent comprising cellulose or a cellulose derivative to form the metal nanoparticles stabilized with the cellulose or cellulose derivative; and
    suspending the metal nanoparticles in a solvent to form the ink.

14. The method of claim 13, wherein the metal nanoparticle precursor comprises silver nitrate, silver acetate, silver citrate, silver formate, silver carbonate, silver fluoride, silver nitrite, silver chloride, silver bromide, silver iodide, silver phosphate, silver oxide, silver hydroxide, silver acetate hydrate, copper formate, copper carbonate, copper fluoride, copper nitrite, copper chloride, copper bromide, copper iodide, copper phosphate, copper acetate, copper citrate, copper hydroxide, copper acetate hydrate, tungsten tungstate dihydrate, barium acetate with titanium tetrachloride, or a combination thereof.

15. The method of claim 13, further comprising heating the reaction solution for about 10 minutes to about 60 minutes.

16. The method of claim 13, wherein the reaction solution further comprises a second reducing agent, a base, or a combination thereof.

17. The method of claim 1, wherein the metal nanoparticles comprise tungsten oxide, barium titanate, or a combination thereof.

18. The method of claim 1, wherein the cellulose or cellulose derivative has a molecular weight of 60,000 g/mol to 1,500,000 g/mol.

* * * * *